United States Patent
Zhou et al.

(10) Patent No.: US 12,549,634 B2
(45) Date of Patent: Feb. 10, 2026

(54) RECOMMENDATION SYSTEM WITH RAPID LEARNING FROM USER FEEDBACK

(71) Applicant: Snap Inc., Santa Monica, CA (US)

(72) Inventors: Zhenpeng Zhou, Newark, CA (US); Maksim Gusarov, Santa Monica, CA (US); Kevin Dechau Tang, New York, NY (US); Lucy Chen, Brooklyn, NY (US); Sait Tuna Onder, Brooklyn, NY (US)

(73) Assignee: Snap Inc., Santa Monica, CA (US)

( * ) Notice: Subject to any disclaimer, the term of this patent is extended or adjusted under 35 U.S.C. 154(b) by 47 days.

(21) Appl. No.: 18/527,089

(22) Filed: Dec. 1, 2023

(65) Prior Publication Data

US 2025/0184398 A1 Jun. 5, 2025

(51) Int. Cl.
*G06F 15/16* (2006.01)
*G06T 5/77* (2024.01)
*H04L 67/1396* (2022.01)
*H04L 67/306* (2022.01)

(52) U.S. Cl.
CPC ............ *H04L 67/1396* (2022.05); *G06T 5/77* (2024.01); *H04L 67/306* (2013.01)

(58) Field of Classification Search
CPC ...... H04L 67/1396; H04L 67/306; G06T 5/77
USPC ........................................................ 709/203
See application file for complete search history.

(56) References Cited

U.S. PATENT DOCUMENTS

| | | | |
|---|---|---|---|
| 2016/0357406 A1* | 12/2016 | Lee ......................... | G06V 10/17 |
| 2016/0378870 A1* | 12/2016 | Brunn .................... | G06F 16/435 |
| | | | 707/732 |
| 2018/0039647 A1* | 2/2018 | Winstanley ......... | G06F 16/9535 |
| 2018/0198990 A1* | 7/2018 | Greenberger ........ | H04N 5/2621 |
| 2020/0364588 A1* | 11/2020 | Knox ..................... | G06V 40/20 |
| 2020/0382568 A1* | 12/2020 | Krochmal ............. | G06Q 50/01 |
| 2023/0216978 A1* | 7/2023 | Noh .......................... | G06T 7/11 |
| | | | 348/239 |
| 2024/0394837 A1* | 11/2024 | Kim ...................... | H04N 23/632 |

* cited by examiner

*Primary Examiner* — Alan S Chou
(74) *Attorney, Agent, or Firm* — Schwegman Lundberg & Woessner, P.A.

(57) ABSTRACT

A system and method that includes retrieving candidate effects to present to a user; computing initial scores for the candidate effects; computing adjusted scores for the candidate effects, each adjusted score for an effect being based on an initial score for the effect and a demotion factor computed based on interaction data associated with the user and the candidate effects; generating a set of recommended effects based on the candidate effects and associated adjusted scores; and causing the set of recommended effects to be presented to the user on a computing device. The demotion factor for the effect is further based on a number of consecutive repeated actions being performed by the user, during a first predetermined interval, with respect to the effect. Effects include lenses, filters, image stylization effects, or video stylization effects, while actions include swipe actions.

19 Claims, 12 Drawing Sheets

RECOMMENDATION SYSTEM WITH RAPID LEARNING FROM USER FEEDBACK

TECHNICAL FIELD

The disclosed subject matter relates generally to the technical field of recommendation systems and, in some examples, to a recommendation system learning from user feedback.

BACKGROUND

Recommendation (or recommender) systems are an integral part of many social media, e-commerce and other digital platforms, responsible for increasing user engagement and satisfaction by providing users with relevant suggestions for purchases, experiences, connections, and so forth.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Recommendation (or recommender) systems are an integral part of many social media, e-commerce and other digital platforms, responsible for increasing user engagement and satisfaction by providing users with relevant suggestions for purchases, experiences, connections, and so forth.

Current recommendation solutions frequently compute relevance or interest scores for candidate items by relying on aggregate statistics of historical interactions between users and platforms. However, such an approach does not work well given sparse user-platform interactions that lead to a brief interaction history, users with differing goals or preferences with respect to the same item, or sudden changes in historical user behavior or user-expressed preferences a short time before a system recommendation is made. For example, consider a user who has applied a suggested augmented reality (AR) filter ten times, but who has most recently viewed the AR filter twice and passed on using it, moving to a follow-up suggestion instead. A recommendation system that only considers aggregate interaction statistics may continue recommending the AR filter to the user, ignoring the most recent relevant feedback provided by the user's decision not to use the filter. While the recommendation system may eventually decline to recommend the filter, a sub-optimal user experience could cause the user to abandon the system before then.

Thus, it may be beneficial for a recommendation system to be able to adapt its suggestions in a timely manner to user-provided feedback. Such adaptation to user feedback corresponds to an example of personalization—ideally, the recommendation system should have capabilities for comprehensive, flexible, and fine-grained personalization to further enhance the user experience.

Examples disclosed herein refer to a recommendation system that addresses the problem of adapting recommendations in a timely manner to user feedback by explicitly incorporating recent user feedback into an updated composition and/or ranking of recommended items. User feedback includes recent interactions of the user with one or more candidate items, where interactions include view, long view, click, swipe, send, snap actions, and more. The recommendation system can compute a set of initial scores for candidate items and adjust one or more of the initial scores using a demotion (or discount) factor automatically computed based on the recent user-system interactions. Recommended items can be effects, media items such as photos, videos or stories, related users or potential contacts, third-party applications, and so forth. Example effects include lenses, filters (e.g., geofilters), stickers, text overlays, visual effects such as blurs or saturation adjustments, segmentation, or partial replacement or inpainting effects, image or video stylization effects, sound effects, and so forth.

Figure 3:
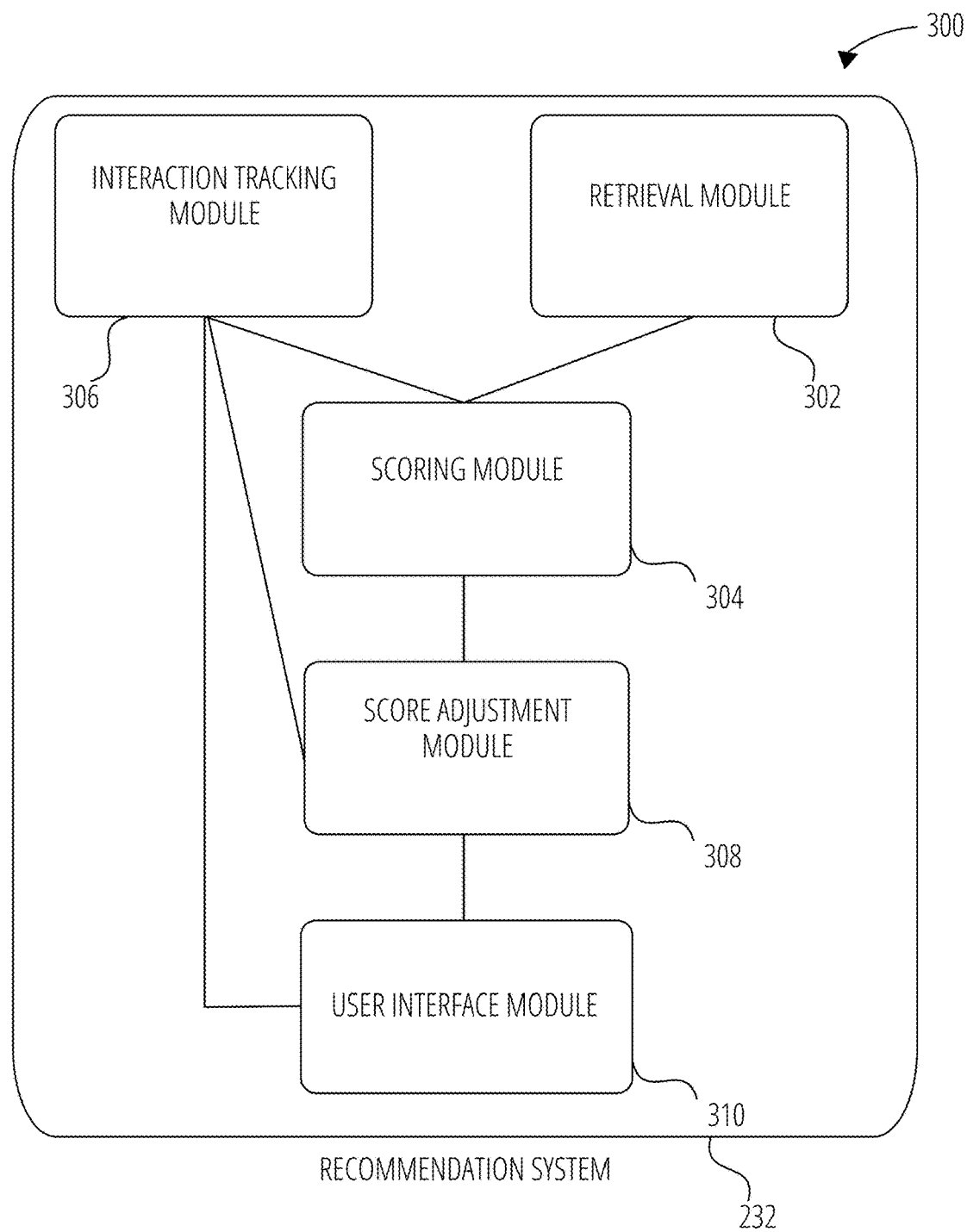
FIG. 3 is a diagrammatic representation of a recommendation system, according to some examples.
Figure 4:
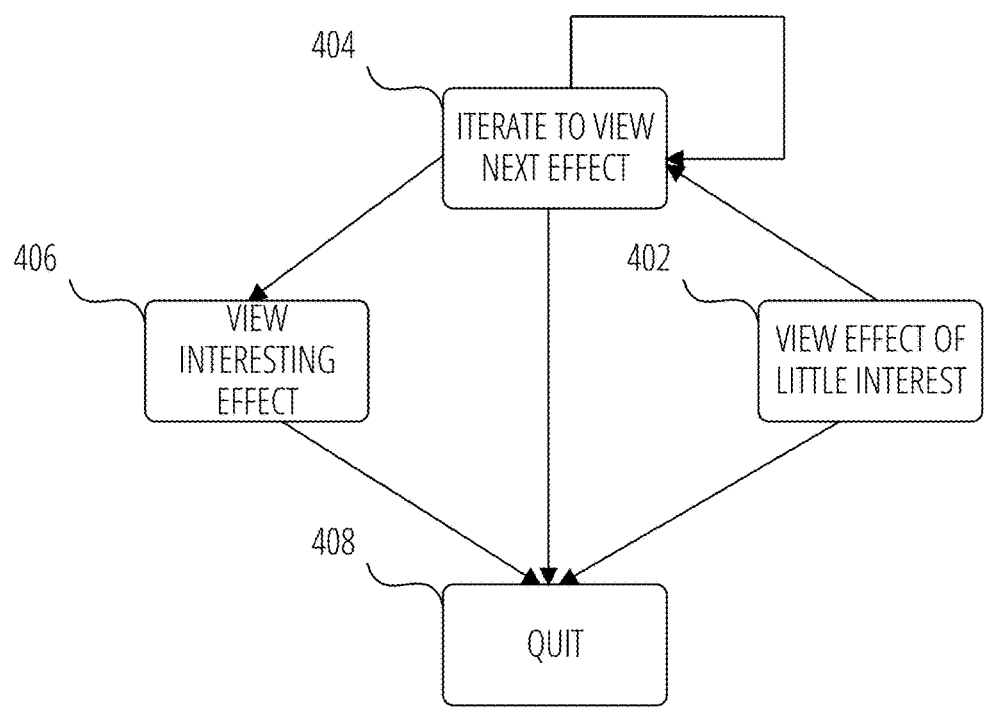
FIG. 4 is a diagrammatic illustration of interactions between a user and a set of effects in a recommendation system, according to some examples.

Furthermore, examples disclosed herein describe how the recommendation system addresses the problem of providing multiple levels of personalization, ranging from no personalization to personalization taking into account detailed user and item data (see at least FIG. 3 and FIG. 4 for details). In some examples, the recommendation system forgoes personalization and computes aggregate relevance scores, such as raw conversion rates for candidate items, and/or uses constant demotion factors for computing adjusted candidate item scores. In some examples, the recommendation system can provide personalization based on user-level information, and/or item-level information. For example, the recommendation system can use one or more trained machine learning (ML) models to compute user-specific relevance scores for candidate items, such as user-specific predicted conversion rates. The recommendation system can also explicitly take into account a user's preferences for different types of candidate items, or for particular items, by computing the demotion factors used in the computation of adjusted scores based on recent user-item interactions.

In some examples, a recommendation system comprises a retrieval module that retrieves candidate items. A scoring module computes a set of initial scores for the candidate items. A score adjustment module computes associated adjusted scores based on the initial scores and/or demotion factors computed based on a history of user interactions with the items. In some examples, the user-system interaction history has been previously recorded by an interaction tracking module. The recommendation system uses candidate item scores, such as initial scores and/or adjusted scores, to compute a set of recommended items by reducing, ranking and/or re-ranking the set of candidate items. The set of recommended items is presented to the user, on a computing device, by a user interface (UI) module. As mentioned, the interaction tracking module records interactions between the user and items presented to the user, such as one or more of the recommended items.

In some examples, the set of candidate items includes a first set of candidate items not interacted with by the user, via one or more selected actions (e.g., swipe actions), during a predetermined interval (e.g., a time period). In some examples, the set of candidate items includes a second set of candidate items previously interacted with by the user, via one or more selected actions, during the specified time period. Given a candidate item, its adjusted score can be computed using a demotion factor based on at least one of: a conversion rate of the user on the first set of candidate items, a conversion rate of the user on the second set of candidate items, a conversion rate of the first set of candidate items, a conversion rate of the second set of candidate items, a base demotion factor, a demotion strength factor, a number of consecutive repeated actions (e.g., consecutive swipe actions) associated with the candidate item and performed by the user during a predetermined interval, and more.

In some examples, computing initial scores for candidate items uses a first ML model trained on a first dataset comprising interactions between users and items. Computing initial scores for candidate items can also use a second ML model trained on a second dataset that solely comprises interactions between users and those items that have previously been interacted with (e.g., via the one or more selected actions).

In some examples, initial scores for the first set of candidate items are generated using the first ML model, while initial scores for the second set of candidate items are generated using the second ML model. Adjusted scores for the candidate items preserve the initial score values.

In some examples, initial scores for all candidate items are generated using the first ML model. Adjusted scores for the first set of candidate items preserve the values of corresponding initial scores. Adjusted scores for the second set of candidate items are computed based on corresponding initial scores and/or associated demotion factors.

Networked Computing Environment

Figure 1:
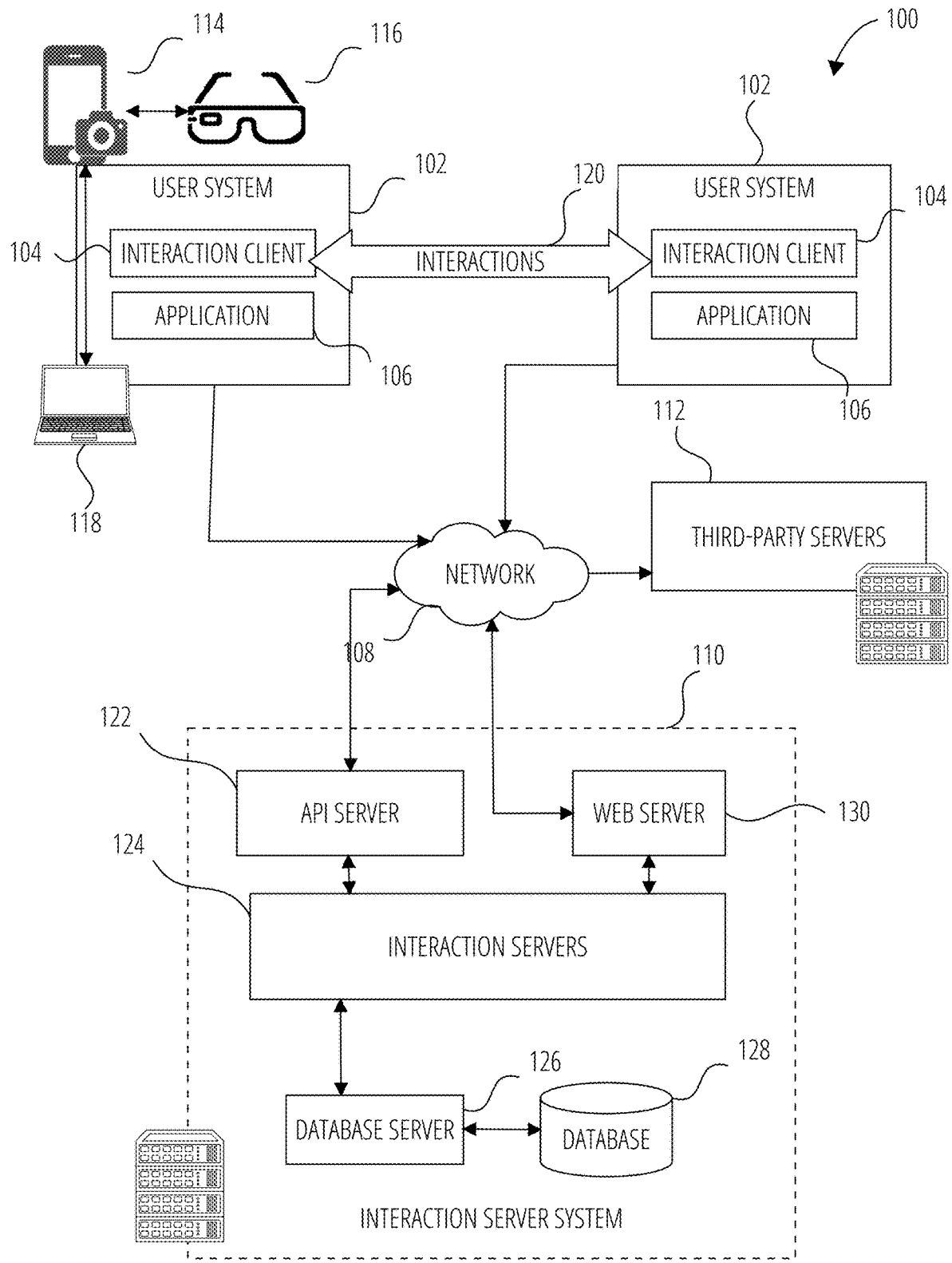
FIG. 1 is a diagrammatic representation of a networked environment in which the present disclosure may be deployed, according to some examples.

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 810); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
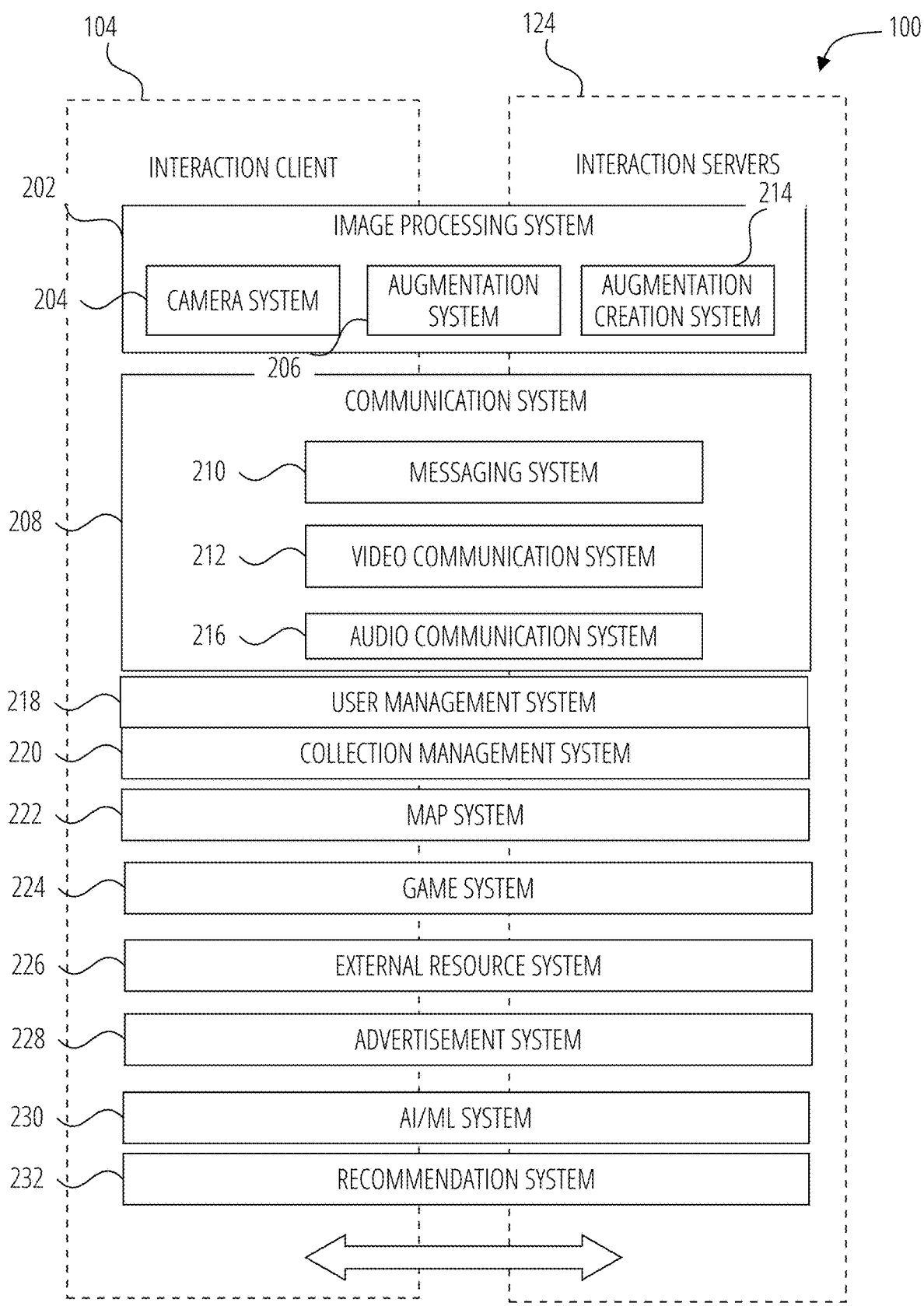
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 1002 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 808, entity graphs 810 and profile data 802) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 802) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An AI/ML system 230 provides a variety of services to different subsystems within the interaction system 100. For example, the AI/ML system 230 operates with the image processing system 202 and the camera system 204 to analyze images and extract information such as objects, text, or faces. This information can then be used by the image processing system 202 to enhance, filter, or manipulate images. The AI/ML system 230 may be used by the augmentation system 206 to generate augmented content and augmented reality experiences, such as adding virtual objects or animations to real-world images. The communication system 208 and messaging system 210 may use the AI/ML system 230 to analyze communication patterns and provide insights into how users interact with each other and provide intelligent message classification and tagging, such as categorizing messages based on sentiment or topic. The AI/ML system 230 may also provide chatbot functionality to message interactions 120 between user systems 102 and between a user system 102 and the interaction server system 110. The AI/ML system 230 may also work with the audio communication system 216 to provide speech recognition and natural language processing capabilities, allowing users to interact with the interaction system 100 using voice commands.

A recommendation system 232 recommends a set of items to a user. Recommended items can be effects, media items such as photos, videos or stories, recommended users or potential contacts, third-party applications, and so forth. In some examples, the recommendation system 232 uses functionality provided by the AI/ML system 230, or can be integrated, partially or fully, in the AI/ML system 230.

A Fast-Learning Recommendation System

FIG. 3 is a diagrammatic representation of a view 300 of a recommendation system 232, according to some examples. The recommendation system 232 includes one or more of an interaction tracking module 306, a retrieval module 302, a scoring module 304, a score adjustment module 308, and a UI module 310.

The recommendation system 232 recommends a set of items to a user, where items can be effects, media items such as photos, videos or stories, recommended users or potential contacts, third-party applications, and so forth. Example effects include lenses, filters (e.g., geofilters), stickers, text overlays, visual effects such as blurs or saturation adjustments, segmentation or partial replacement or inpainting effects, image or video stylization effects, sound effects, and so forth. A user can interact with items recommended by the system, and the system can record the interactions. The recommendation system 232 uses recorded user-system interactions to update its recommendations in a timely manner based on user feedback, as further detailed below. Example interactions include selecting an item, performing a conversion action for a given item, and so forth. Selection actions include view actions, swipe actions (e.g., swiping a lens), and so forth. Conversion actions include applying an effect (e.g., applying a lens or filter to a media item), sending an item or an artifact to another user (e.g., sending a snap, sending a modified media item), posting an item, playing or viewing an item for a predetermined period of time (e.g., long view action), inviting another user to connect, and so on. For illustrative purposes only, the description herein focuses, without narrowing the scope of the disclosure, on a recommendation system 232 recommending a set of effects to a user (e.g., a set of lenses or filters).

The retrieval module 302 retrieves a set of candidate effects for display to a user. The effects are retrieved by querying one or more databases or datastores, for example based on one or more effect type (e.g., AR filter, stylization filter), one or more effect property (e.g., "dateCreation" time stamp), user identifiers (ID), session IDs, effect, or effect collection IDs, and so forth. The size of the set of candidate effects corresponds to the total number of effects that could potentially be shown to users (e.g., a number in the [250-500] range for lenses, a number in the [1000-5000] range for other effect types, etc.).

The scoring module 304 computes initial scores for one or more of the candidate effects, as detailed below. The score adjustment module 308 computes one or more adjusted scores by updating initial scores based on interaction data that captures the interactions of users with effects, data that is recorded by the interaction tracking module 306. In some examples, the score adjustment module 308 uses such interaction data to derive one or more demotion factors for adjusted score computation, as described further below.

The recommendation system 232 uses initial and/or adjusted scores of candidate effects to generate a set of recommended effects presented to the user, on a computing device, by the UI module 310. The set of recommended effects can be computed by reducing, ranking, or re-ranking the set of candidate effects based on associated initial scores and/or adjusted scores. In some examples, reducing the set of candidate effects includes removing select candidate effects based on their associated scores transgressing one or more thresholds. Given the set of recommended effects presented to the user, the interaction tracking module 306 records interactions of the user with some or all of the recommended effects.

In some examples, the recommendation system 232 stores, for each user and/or recommendation session, one or more of the set of candidate effects, the set of recommended effects, associated initial and/or adjusted scores, used models or parameters, and so forth. The recommendation system 232 can compute, track over time, and store the values of relevant system performance metrics, such as average time spent viewing an effect, the likelihood of a click/send/snap/other conversion action, diversity indicators of recommended effect sets, and so forth. The recommendation system 232 can provide an API to allow a platform or service to access some or all of the stored data. For example, the API can be used to integrate recommended effects into additional user experiences.

Computing Initial Effect Scores

The scoring module 304 computes initial scores for a set of candidate effects. Such scores include raw or predicted effect conversion rates (CVR), as detailed below.

Raw Effect Scores A raw CVR of an effect—for brevity, a CVR of an effect—corresponds to the rate at which one or more conversion actions are taken with respect to the effect by one or more users. A CVR value for a set of effects can be computed by aggregating CVR values for each of the effects in the set, in the context of the one or more users.

In some cases, users may treat certain effects, such as effects they have recently interacted with, differently from others. A conditional CVR of an effect is defined as a CVR when the effect has been previously acted upon, via one or more selected actions, by one or more users. In some examples, the actions include view actions, swipe actions, and so forth. In some examples, the one or more actions were taken during a predetermined interval, such as a previous time period of a given duration. For example, a conditional CVR of a lens refers to a CVR of a lens previously swiped, during a predetermined time period, by one or more users.

Additionally, different users may have different preferences for an effect, in which case effect scores should differ by user. In the disclosure herein, a personalized conditional CVR of an effect with respect to a user refers to a CVR of an effect previously acted upon, via the one or more actions, by the specific user.

CVR values of effects can be computed based on a history of user interactions with effects. The interaction tracking module 306 generates and/or stores an interaction record that includes an effect ID, a user ID, a time stamp, and/or at least one event type (e.g., conversion event, swipe_event, view_event) and so forth. Events correspond to user actions with respect to effects (e.g., a conversion action, a swipe action, etc.). An event type can be accompanied by a categorical or numerical indicator (e.g., a Boolean flag or an indicator with values $\{0, 1\}$) that marks whether a particular event type was observed or not for a particular interaction. Alternatively, an event type is included in the interaction record only when the type of event occurred as part of the interaction. In some examples, the interaction record includes a flag corresponding to whether an event or action has previously occurred in the context of the effect and/or user, such as a Boolean "previouslySwiped" flag.

CVR values of effects are computed by grouping, by effects or effect IDs, interaction records including conversion events, and computing the CVR for each effect. The CVR of an effect can be computed as a ratio between the number of conversion events for the effect and the number of view events for the effect. The conditional CVR of an effect can be computed as the ratio between the number of conversion events under the condition of the effect having been previously acted upon via one or more actions (e.g., swipe actions) and the number of events corresponding to the one or more actions being taken with respect to the effect. For example, the conditional CVR of an effect can be computed as follows: 1) retrieve interaction records for the effect, and let $R_1$ denote the set of such records for which a "previouslySwiped" Boolean flag is true (e.g., other flags corresponding to other previous actions can be used); 2) let $R_2$ denote the subset of $R_1$ interaction records including a conversion event; 3) set the conditional CVR value for the effect to be the ratio between the number of elements in $R_2$ and the number of elements in $R_1$. The personalized conditional CVR of an effect for a given user can be similarly computed, with the difference that the interaction records retrieved in step 1) include both the effect and the user of interest.

A CVR value can be computed for a single type of conversion action or event, or can be aggregated or combined over multiple types of conversion actions or events. A CVR value can be computed for one user or be aggregated or combined over multiple users. Aggregation or combination functions in any aggregation operations in the disclosure herein include regular or weighted average/mean, the median, minimum or maximum functions, noisy-OR, and other functions known in the art.

Predicted Effect Scores In some cases, the recommendation system 232 can use one or more machine learning (ML) models to predict the conversion rate of an effect. Such ML models can include user features like user gender or age group, effect features such as effect category, and user-effect features like number of interactions between a user and a specific effect. Training data collection can use, for example, the interaction tracking module 306, which tracking interactions between users and effects.

As noted above, different users may have different preferences for an effect, in which case effect scores should differ by user. The recommendation system 232 can use at least one machine learning model (e.g., ML model) to predict a user-specific score of a candidate effect (e.g., compute a predicted CVR of the effect in the context of the user). For example, the scoring module 304 can use a generic ML model trained on a training dataset including all effects (e.g., lenses) available to the system. In some examples, the training dataset includes data from multiple users. In some examples, the training dataset only includes data of the target user.

As noted above, users may treat certain effects, such as effects they have recently interacted with, differently from others. The scoring module 304 can explicitly model this phenomenon using a specialized ML model trained on a training data set including certain effects, such as effects interacted with using one or more selected actions (e.g., swipe actions). The training dataset can include data from a single user, or multiple users. Thus, the scoring module 304 can use the specialized ML model to compute an initial score for a candidate effect interacted with by a user, using the one or more selected actions, during a predetermined period of time (e.g., 12 hours/24 hours/etc.). Such a prediction score corresponds to an approximation of a personalized conditional CVR value for the given effect and the specific user. The scoring module 304 can use the generic ML model to compute an initial score for a candidate effect in the context of a user if the effect has not been interacted with by the user, using the one or more selected actions, during the predetermined period of time. For example, given a user and a lens not swiped by the user during a previous predetermined period of time, the scoring module 304 can use a generic ML model to compute an initial score for the lens (e.g., a predicted CVR value).

In an illustrative example, with S(L) denoting a lens score, the scoring module 304 can compute scores for example lenses as follows:

Given $L_1$, where $L_1$ has not been swiped by a user during the previous time period T=1 day, $S(L_1)=S_{genericModel}(L_1)$;

Given $L_2$, where $L_2$ has been swiped by the user during the previous time period T=1 day, $S(L_2)=S_{specializedModel}(L_2)$.

Given $L_3$, where $L_3$ has not been swiped by the user during the previous time period T=1 day, $S(L_3)=S_{genericModel}(L_3)$, etc.

The one or more ML models used as described above are re-trained or at predetermined intervals (e.g., daily/every 48 hours/weekly, etc.).

The scoring module 304 can use one of the above strategies to compute initial scores associated with candidate effects. In some examples, the scoring module 304 can use multiple such strategies to compute multiple corresponding scores for each effect of the candidate effects. An initial score for each effect can be computed by aggregating or combining the multiple corresponding scores.

Adjusting Effect Scores

A score adjustment module 308 automatically decides whether and how to adjust one or more of the initial scores computed by the scoring module 304. Thus, the score adjustment module 308 computes one or more corresponding adjusted scores based on the one or more of the candidate effects. In some examples, initial scores are adjusted based on interaction data capturing recent interactions of users with candidate effects.

In some examples, the initial score for a candidate effect can be discounted using a demotion (or discount) factor that penalizes certain candidate effects, such as those recently interacted with by the user via one or more selected actions. For example, a demotion factor can that take into account a number of recent consecutive swipe/pass/discard actions involving the candidate effect, where the set of actions indicates a user's recent lack of interest in the effect. In some examples, adjusting the initial score of a candidate effect uses a decay function (e.g., an exponential decay function).

Demotion Factors In one illustrative example, the score adjustment module 308 receives a set of initial candidate effect scores (e.g., computed by a generic ML model in the context of a particular user). Given a specific subset of candidate effects, such as recently swiped lenses, the score adjustment module 308 can adjust their initial scores to approximate scores computed by a specialized ML model, such as one solely trained on swiped lens data. For example, given a swiped lens with an initial lens score $S_{initial}(L)$, the score adjustment module 308 can compute an adjusted lens score $S_{adjusted}(L)$ by discounting the initial score using a demotion factor D:

$$S_{adjusted}(L) = S_{initial}(L) - D$$

In some examples, the demotion factor D is a constant.

In some examples, a subset of candidate lenses have been previously swiped during a time period T of predefined duration (e.g., T=15 minutes/30 minutes/1 hour/24 hours/48 hours, etc.). Given an example demotion factor D=0.2, initial scores for example lenses can be adjusted as follows:

$S_{initial}(L_1)=0.9$, where $L_1$ has not been swiped by a user in T=1 day=>$S_{adjusted}(L_1)=0.9$ $S_{initial}(L_2)=0.8$, where $L_2$ has been swiped by the user during the past T=1 day=>$S_{adjusted}(L_2)=S(L_2)-D=0.6$ $S(L_3)=0.8$, where $L_3$ has not been swiped by the user in T=1 day=>$S_{adjusted}(L_3)=0.8$ In some examples, the demotion factor D is a variable factor that itself explicitly models different users having different preferences for effects previously interacted with via one or more selected actions (e.g., previously swiped lenses). For example, given a lens L and a user U, a demotion factor D(L, U) is computed as follows:

$$D(L, U) = K * (v_2 - v_1 + 1),$$

where:

K controls the strength of the demotion (e.g., K=constant);

$(v_2-v_1+1)$ a scale factor such that:

$v_1$=CVR of user U on lenses previously swiped by U during a predetermined interval.

$v_2$=CVR of user U on lenses not swiped by U during the predetermined interval.

In some examples, the predetermined interval is a previous period of time of predetermined duration (e.g., 15 minutes/30 minutes/1 hour/12 hours/24 hours/etc.). In some examples, the predetermined interval refers to a set of previous user actions of predetermined size (e.g., last 20 actions/last 30 actions, etc.). A CVR of a user corresponds to the rate at which the user performs a conversion action with respect to one or more presented effects. A conditional CVR of a user refers to the CVR of a user given a subset of effects previously acted upon via one or more selected actions (e.g., a subset of previously swiped lenses). In some examples, the one or more selected actions are performed by the user (e.g., as in $v_1$ above). CVR values for users are computed based on user-effect interaction data, as tracked by the interaction tracking module 306. Interaction records comprising conversion events can be grouped by user IDs and the CVR for each user can be computed. In some examples, a CVR value for a user U and a set of effects is computed by aggregating CVR values for U and each effect in the set of effects (e.g., set of lenses previously swiped by the user U, set of lenses not previously swiped by the user U, etc.). In some examples, a CVR value for a user and a set of effects is computed directly as a ratio between the number of user-specific conversion events involving any of the effects and the number of user-specific view events involving any of the effects.

Using the above formula for the demotion factor D and example pairs of values for $v_1$ and $v_2$ below, demotion factor D values can be computed as follows:

$$v_1 = 0.4, v_2 = 0.6 = > D(L, U) = K * 1.2$$

$$v_1 = 0.6, v_2 = 0.4 = > D(L, U) = K * 0.8$$

As seen herein, the demotion factor D is smaller when a user has a higher conversion rate for previously swiped lenses than for non-previously swiped lenses, compared to the reverse. In some examples, K can be set to 0 if $v_2 < v_1$, which leads to the demotion factor being 0 for swiped lenses recommended to a user with a higher conversion rate for previously swiped lenses than non-previously swiped lenses.

In some examples, an example $(v_m - v_n + 1)$ scale factor can be made adaptable and/or tunable as follows:

$$(v_m - v_n + 1) \rightarrow \text{scale}(v_m - v_n, \text{kernel}_i, \text{bias}_i),$$

where:

$$\text{scale}(x, \text{kernel}, \text{bias}) = \text{sigmoid}(\text{kernel} * x + \text{bias})$$

The sigmoid function ensures that the computed value is in a desired (minValue, maxValue range) (e.g., the (0,1) range), while kernel and bias are quantities that control the distribution of the scale factor.

In some examples, the score adjustment module 308 computes a demotion factor D that explicitly takes into account lens-specific information. For example, given a user U and a lens L, a demotion factor D can be computed as:

$$D(U, L) = K * \text{scale}(v_2 - v_1, \text{kernel}_1, \text{bias}_1) * \text{scale}(v_4 - v_3, \text{kernel}_2, \text{bias}_2)$$

where:
- $v_1$=CVR of U on lenses previously swiped by U during a predetermined interval
- $v_2$=CVR of U on lenses not previously swiped by U during the predetermined interval
- $v_3$=CVR of the lenses previously swiped by U during the predetermined interval
- $v_4$=CVR of the lenses not previously swiped by U during the predetermined interval The above CVR quantities can be computed, as previously described, based on historical user-lens interaction data, such as the data tracked by the interaction tracking module 306. As detailed above, a predetermined interval can refer to a period of time and/or a set of user-system interactions.

In some examples, the quantity K that controls the strength of the demotion can be a constant. Alternatively, K can be computed based on a history of recent interactions of the user with the set of lenses. For example, let numSwipes denote the number of consecutive times the user has swiped lens L during a predetermined interval (e.g., a predetermined period of time, a predetermined set of user-lens interactions prior to the last user action, etc.).

K can be computed as follows:

$$K = K_0 * (1 - F^{numSwipes})/(1 - F),$$

as part of an example overall demotion factor estimation D(U, L):

$$D(U, L) = K * \text{scale}(v_2 - v_1, \text{kernel}_1, \text{bias}_1) * \text{scale}(v_4 - v_3, \text{kernel}_2, \text{bias}_2),$$

where F is a demotion strength factor (e.g., F>0), and $K_0$ is a constant, corresponding to a base demotion factor. The larger $K_0$, F, or numSwipes are, the more the initial score of lens L will be reduced. Alternative or additional selected actions (e.g., a pass action, a discard action, etc.) can be used in the above computation of K. In some examples, the considered actions of the same or multiple types in a predetermined interval need not be consecutive. The above formulation for K can be seen as an approximation of an optimal policy in Markov Decision Process (MDP) that models the interactions between a user and a system presenting the user with a set of effects. In some examples, the recommendation system 232 can compute such an optimal policy and use it to iteratively recommend effects to a user, taking into account the user's interactions with the presented effects (see FIG. 4 for details).

In some examples, an initial score for a lens L can be directly discounted based on a decay function (e.g., an exponential decay function) and a number of consecutive repeated actions, such as consecutive swipes during a predetermined interval:

$$S_{adjusted}(L) = S_{initial}(L) * (1 - F_1)^{numSwipes}$$

where $F_1$ is a constant, corresponding to a decay rate (e.g., e/0.1/0.25/0.3/etc.)

The above demotion factor D(U, L) formulations can be instantiated to generate examples of the recommendation system 232 that meet examples of desired functionality requirements, as seen below.

Example requirement A Given an effect passed on or seen and discarded by a user, the recommendation system 232 should move the effect towards the bottom of a ranking of effects being presented to the user. For example, a lens swiped by a user should be automatically moved towards the back of a lens carousel.

Example requirement B If the recommendation system 232 determines the user continued not positively engaging with the effect as the user iterates through presented effects, the effect should be further downranked (e.g., moved towards the bottom of the ranking). Examples of positive engagement include conversion actions, expressing positive feedback via visual indicators such as emojis, and so forth.

Example requirement C If the recommendation system 232 determines that the user has positively engaged with a previously passed on and/or downranked effect, the effect should not be further downranked and/or be automatically promoted, by being moved towards the top of the effect set ranking.

Given a lens effect, the above formulation for K and parameter values $K_0$=0.2, F=0.9, and numSwipes=1, the value of K is 0.2. Given parameter values $K_0$=0.2, F=0.9, and numSwipes=2, the value of K is 0.38. The first parameter set corresponds to requirement A being met, while the second parameter set corresponds to requirement B being met. Thus, when a downranked lens continues to not receive positive user engagement, the value of K increases, leading to an increase in the value of demotion factor D, which leads to the lens being further downranked or penalized. Given parameter values $K_0$=0.2, F=0.9, and numSwipes=0, the value of K is 0. This third parameter set corresponds to requirement C being met, as it leads to demotion factor D=0, corresponding to no demotion of the specific effect.

Thresholding Effect Scores

The recommendation system 232 can compute one or more thresholds associated with candidate effect scores, such as initial or adjusted scores. Such thresholds can be computed and used to remove candidate effects by the score adjustment module 308, the UI module 310, scoring module 304, or other system components. In some examples, thresholds can be elicited from developers and/or product designers, via the UI module 310.

In an illustrative example, the scoring module 304 can compute one or more thresholds for effect scores represented by conditional CVR values of effects using a conditional CVR distribution among different effects in the set of all effects, and/or a conditional CVR distribution for the online traffic involving effects being used on a platform for given period of time. In some examples, the scoring module 304 can compute percentiles for each conditional CVR distribution based on recorded user-effect data for a predetermined period of time. Given the computed percentiles and a requested percentile of effect traffic to be kept (e.g., the 50th percentile, etc.), the scoring module 304 automatically retrieves a relevant CVR score value associated with the relevant percentile as a threshold (e.g., threshold=0.3). In some examples, the threshold can be determined, based on the computed percentiles, based on an input percentile of the set of all candidate lenses (e.g., only the top 60th percentile should be retained, etc.).

Recommending Effects Based on Effect Scores

Given a set of candidate effects with associated adjusted and/or initial scores, the user interface (UI) module 310 presents one or more of the candidate effects to the user. The UI module 310 can display all or a subset of the candidate effects, ranked according to their associated scores. The UI module 310 can select a predetermined maximum number N of candidate effects (e.g., N=1/5/10/etc., N is a percentage of candidate effect set size, etc.), for example by retaining the highest-ranking candidates to be shown to the user. The UI module 310 can discard M of the lowest-ranked candidate effects (e.g., M is a predetermined constant, percentage of candidate effect set size, etc.). The UI module 310 can use a developer-supplied or automatically computed threshold, as described above, to remove all effects whose score is below the threshold. The UI module 310 can construct a set of recommended effects based on the set of candidate effects and their associated scores, using one or more of the strategies above.

The UI module 310 can display the recommended effects to the user via UI elements such as a list, menu, carousel, or other gallery. The specific UI element used depends on the platform and aims to provide an engaging experience for users to interact with the effects. Image, notification, or animation UI elements can draw user attention to the highest-ranked effects, in order to increase the likelihood of user engagement and feedback on the most relevant effects. The user can manually adjust or control the set of recommended effects (e.g., by navigating through the effect set, swiping effects, and so forth).

Effect Recommendation as a Markov Decision Process

FIG. 4 is a diagrammatic illustration of interactions of a user with effects being presented to the user by a recommendation system 232, according to some examples.

At operation 402, the recommendation system 232 determines that an effect presented to the user is of little or no interest, for example based on the user's viewing of the effect, followed by a swipe in the absence of any conversion operation. The user can then quit, as determined by the recommendation system at operation 408, or further iterate through the set of effects (e.g., swipe for next lens in a lens carousel), as determined at operation 404. At operation 406, the recommendation system determines that a subsequent effect is of interest, for example based on determining that the user took a conversion action with respect to a viewed subsequent effect. Alternatively, the user can quit, as determined at operation 408. In some examples, the user can continue iterating (as determined at operation 404) through the set of effects after finding a first effect of interest (not shown). The quit action can refer to exiting the display of recommended effects, switching applications, and more.

The recommendation system 232 can model the problem of recommending effects to a user in the context of user-effect interactions, such as those above, as a Markov Decision Process (MDP). The recommendation system 232 automatically computes an optimal effect recommendation policy (e.g., lens serving policy) for the MDP, as discussed below. The optimal effect recommendation policy selects effects to be presented to the user in order to optimize a specific metric (e.g., time spent viewing an effect, the likelihood of a click/send/snap/other conversion action taken by the user, etc.), as described in more detail below. Given a user's interaction(s) with a set of effects, the effect recommendation policy indicates what effect should be shown next to the user by the recommendation system 232. In some examples, the set of effects is a set of candidate effects ranked, for example, with respect to previously computed scores (e.g., initial or adjusted scores as described in FIG. 3). Given a computed effect recommendation policy, the recommendation system 232 can thus use it to provide almost real-time adaptation to user feedback in the form of user interactions with presented effects.

In an MDP, a deterministic policy specifies, for each state of a set of states, an action to be taken by a system solving a domain problem of interest (e.g., effect recommendation, lens serving, etc.). An optimal policy is a policy with an optimal value function, characterized by achieving the best value V (e.g., highest expected utility) at any state s:

$V^*(s) = \max_\pi V^\pi(s)$, where $\pi$ is a policy of the set of all possible policies.

In some examples, the recommendation system 232 can use value iteration or policy iteration algorithms, as known in the art, to compute an optimal policy, such as optimal effect recommendation policy. The recommendation system 232 automatically constructs a MDP corresponding to the problem domain of recommending effects to users as follows:

a. S is a set of MDP states. Herein, each state in S corresponds to a current viewing or interaction history of a user (e.g., {swipe_lens$_1$, send_lens$_1$, swipe_lens$_2$, swipe_lens$_3$}).

b. A is a set of actions. Herein, each action corresponds to the recommendation system 232's presentation of a specific effect to the user. Thus, the action set or action space includes the effects available for potential presentation to the user (e.g., the recommended effects, the candidate effects, etc.).

c. P(s'|s, a) is a probability of transitioning to state s' conditioned on the previous state being s and the action a having been taken (e.g., the probability function corresponds to a state transition function). Herein, s and s' are two states corresponding to two versions of the user-system interaction history. The probability corresponds to the user having been in state s, being presented with an effect (as a result of an action a of the recommendation system 232), and taking a user action that leads to state s'.

d. R(s) corresponds to a reward function, based on a metric to be optimized by the recommendation system 232. For example, the recommendation system 232 can seek to maximize the sending of items augmented using an effect or a lens. An example reward function in this case can indicate that R(s)=1 if state s ends with a send_effect$_n$ (e.g., send_lens$_n$ action, corresponding to sending a snap including a lens), and 0 otherwise.

e. $\gamma$ is a discount factor (e.g, the MDP discount factor that determines the relative importance of distant versus immediate future rewards and/or actions). Herein, user actions are not downweighed based on the specific position of the effect in the ranking, and therefore $\delta=1$.

As indicated above, the recommendation system 232 can automatically compute an optimal effect recommendation policy for a MDP formulation as defined above, and use it to recommend effects, such as lenses, to a user. In some examples, as described in relation to FIG. 3, the recommendation system 232 uses an approximation to a full optimal policy which retains desired aspects of the user-system interaction, while reducing computation costs associated with value iteration and/or policy iteration methods.

Example Methods

Figure 5:
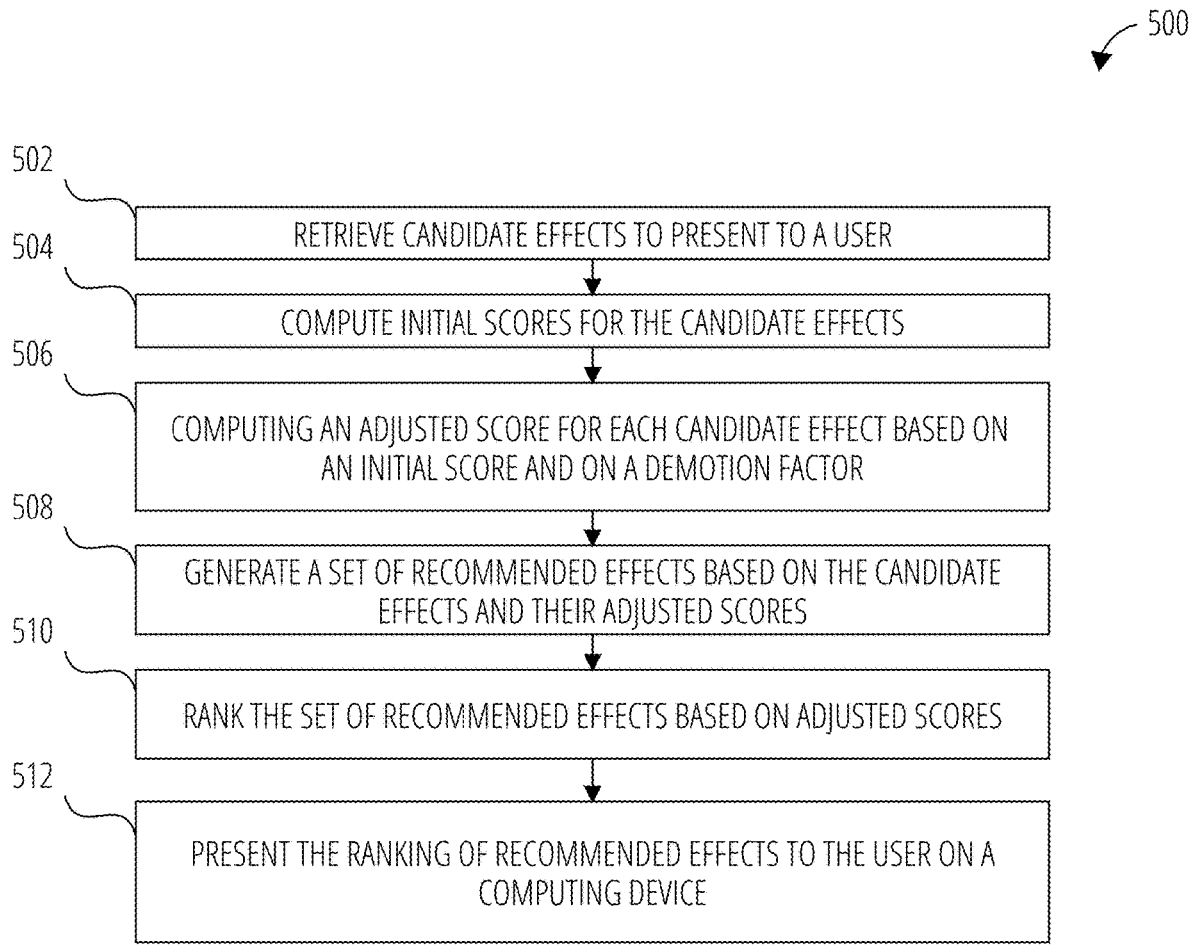
FIG. 5 is a flowchart illustrating a method implemented by a recommendation system, according to some examples.

FIG. 5 is a flowchart illustrating a method 500, according to some examples, as implemented by the recommendation system 232. The recommendation system 232, via the retrieval module 302, retrieves a set of candidate effects to present to a user at operation 502. At operation 504, the recommendation system 232 computes initial scores for the candidate effects at scoring module 304. At operation 506, the recommendation system 232, via the score adjustment module 308, computes adjusted scores for the candidate effects, the adjusted score for each effect being based on an initial score and on a demotion factor. In some examples, adjusted scores are computed for some of the candidate effects. In some examples, generated adjusted scores for some of the candidate effects preserve the values of the initial scores. At operation 508, the recommendation system 232 generates a set of recommended effects based on the candidate effects and their adjusted scores. At operation 510, the recommendation system 232 ranks the recommended effects based on their associated adjusted scores, and presents, at operation 512, the ranked recommended effects to the user on a computing device.

Figure 6:
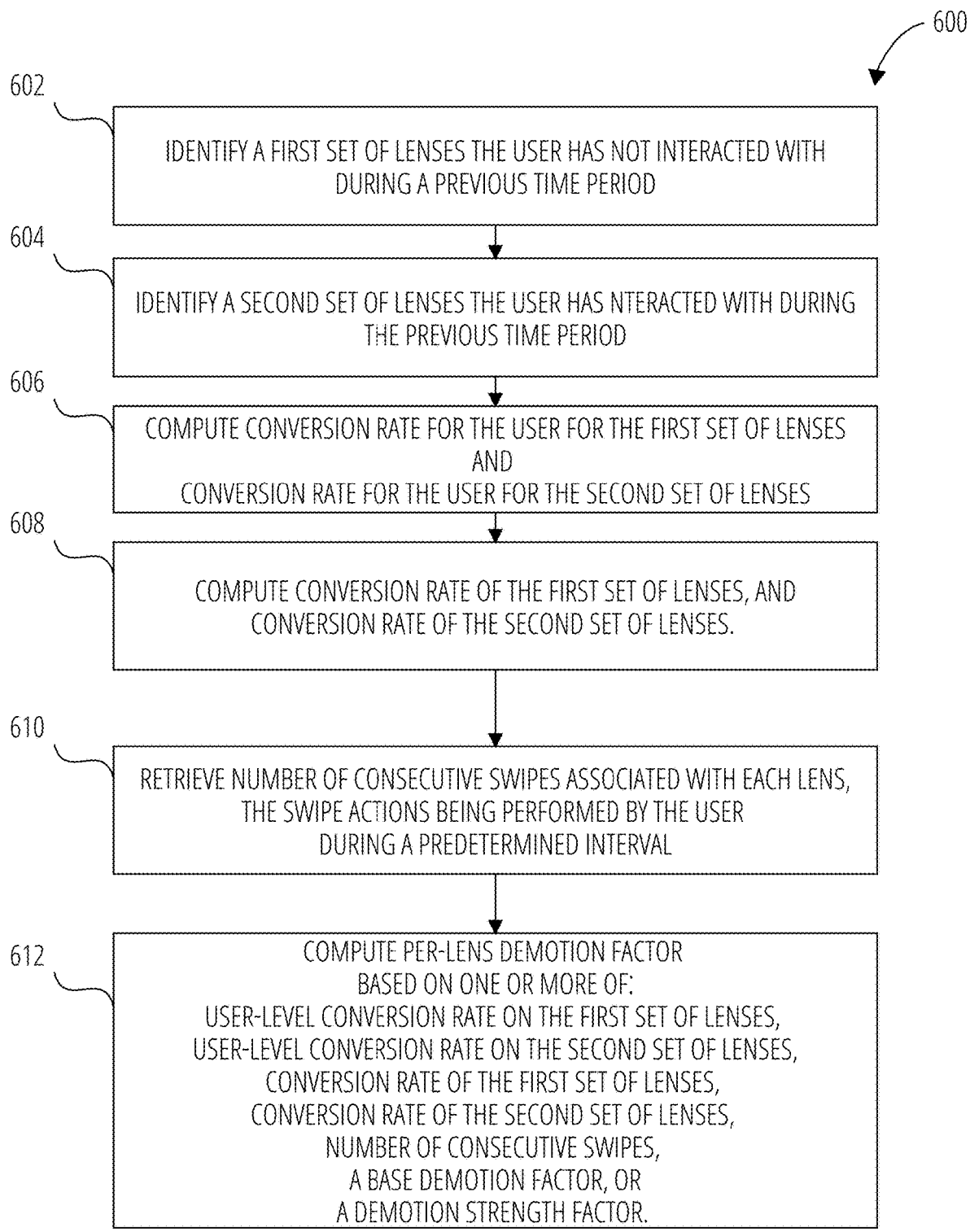
FIG. 6 is a flowchart illustrating a method implemented by a recommendation system, according to some examples.

FIG. 6 is a flowchart illustrating a method 600 for computing demotion factors associated with effects, as implemented by a recommendation system 232, according to some examples. Method 600 can be implemented using the score adjustment module 308 and/or the interaction tracking module 306, among other components of the recommendation system 232.

In some examples, given a set of candidate effects together with a set of initial scores, the score adjustment module 308 computes a set of adjusted scores for the candidate effects based on the initial scores and/or a demotion factor computed based on a history of interactions between a user and the candidate effects. Method 600 is an illustrative example of the computation of demotion factors for lens effects. The same method can be used for other effect types or for other recommendation items, as discussed in conjunction with FIG. 3.

Given a user, a set of candidate lenses and their associated initial scores, the score adjustment module 308 computes an adjusted score for each lens taking into account past interactions between the user and the candidate lenses, and/or one or more parameters.

At operation 602, the score adjustment module 308 identifies, for example by querying the interaction tracking module 306, a first set of lenses of the candidate lenses such that the user has not interacted with the first set of lenses during a previous time period (e.g., 12 hours/24 hours, etc.). Similarly, at operation 604, the score adjustment module 308 identifies, for example by querying the interaction tracking module 306, a second set of lenses of the candidate lenses such that the user has interacted with the second set of lenses during the previous time period.

The score adjustment module 308 computes at operation 606 conversion rates for the user on the first and second set of lenses. In some examples, operation 606 only computes one of the respective conversion rates. At operation 608, the scored score adjustment module 308 computes conversion rates for the first and second set of lenses (in some examples, only one conversion rate for one set of lenses is computed). Conversion rates are computed as described at least in relation to FIG. 3.

At operation 610, the score adjustment module 308 retrieves a number of consecutive swipes associated with each lens in the set of candidate lenses during a predetermined interval (e.g., past 15 minutes/30 minutes/1 hour/24 hours, or during the past 20/30/40 interactions with the system). At operation 612, the score adjustment module 308 computes a demotion factor associated with each lens using one or more of: either of the above-discussed user-level conversion rates on the first and second set of lenses, either of the conversion rates of the first and second set of lenses, the number of previous consecutive swipes associated with the lens, a base demotion factor or a demotion strength factor.

Figure 7:
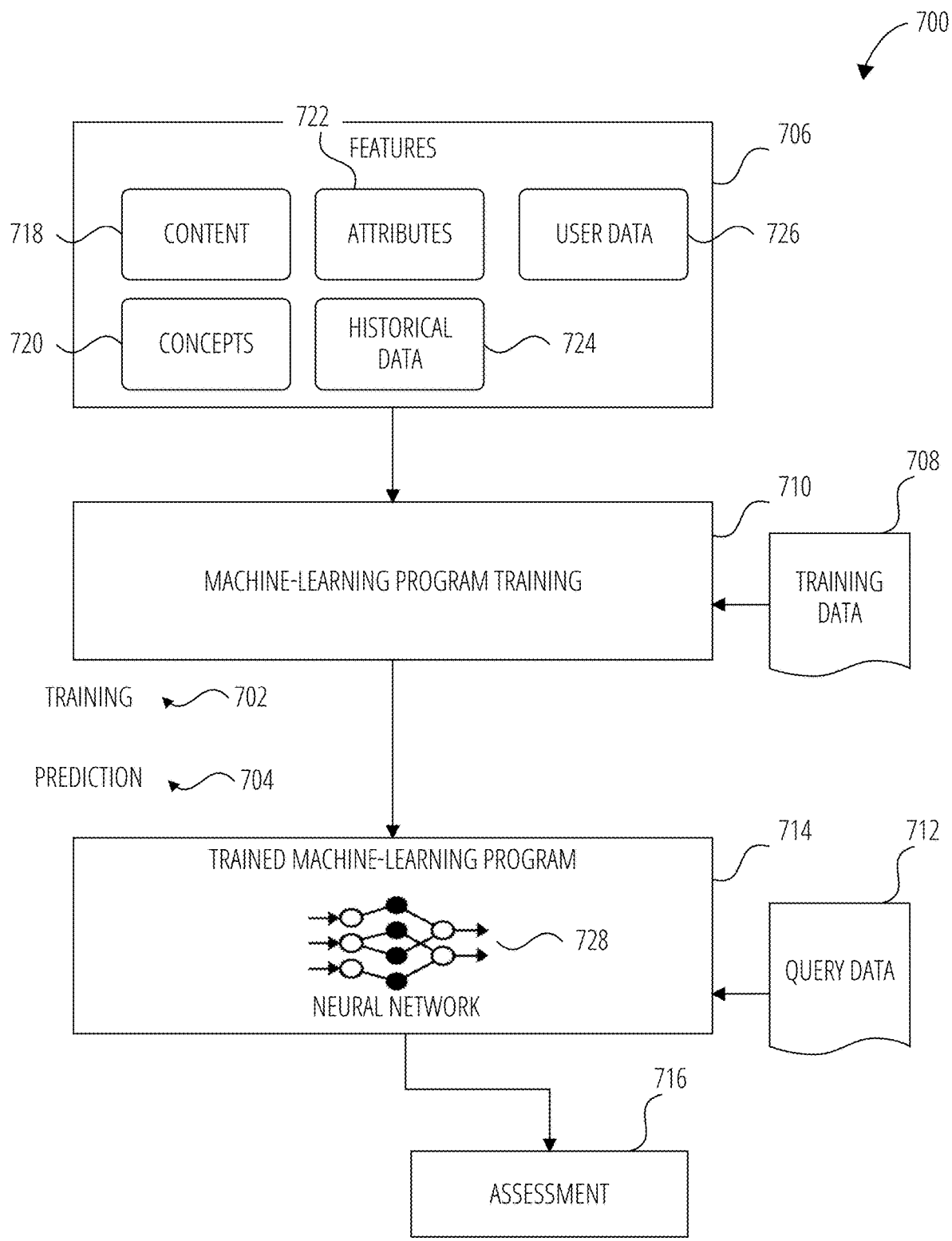
FIG. 7 is a block diagram showing a machine-learning program according to some examples.

FIG. 7 is a block diagram showing a machine-learning program 700 according to some examples. The machine-learning program 700, also referred to as machine-learning algorithms or tools, are used to train machine learning models, which can be used by the recommendation system 232, as described at least in FIG. 3 herein.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine-learning tools operate by building a model from example training data 708 in order to make data-driven predictions or decisions expressed as outputs or assessments (e.g., assessment 716). Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), Gradient Boosted Decision Trees (GBDT), neural networks (NN), matrix factorization, and Support Vector Machines (SVM) tools may be used. In some examples, one or more ML paradigms may be used: binary or n-ary classification, semi-supervised learning, etc. In some examples, time-to-event (TTE) data will be used during model training. In some examples, a hierarchy or combination of models (e.g., stacking, bagging) may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning program 700 supports two types of phases, namely a training phase 702 and prediction phase 704. In a training phase 702, supervised learning, unsupervised or reinforcement learning may be used. For example, the machine-learning program 700 (1) receives features 706 (e.g., as structured or labeled data in supervised learning) and/or (2) identifies features 706 (e.g., unstructured or unlabeled data for unsupervised learning) in training data 708. In a prediction phase 704, the machine-learning program 700 uses the features 706 for analyzing input (or query) data 712 to generate outcomes or predictions, as examples of an assessment 716.

In the training phase 702, feature engineering is used to identify features 706 and may include identifying informative, discriminating, and independent features for the effective operation of the machine-learning program 700 in pattern recognition, classification, and regression. In some examples, the training data 708 includes labeled data, which is known data for pre-identified features 706 and one or more outcomes. Each of the features 706 may be a variable or attribute, such as individual measurable property of a process, article, system, or phenomenon represented by a data set (e.g., the training data 708). Features 706 may also be of different types, such as numeric features, strings, and graphs, and may include one or more of content 718, concepts 720, attributes 722, historical data 724 and/or user data 726, merely for example.

In training phases 702, the machine-learning program 700 uses the training data 708 to find correlations among the features 706 that affect a predicted outcome or assessment 716.

With the training data 708 and the identified features 706, the machine-learning program 700 is trained during the training phase 702 at machine-learning program training 710. The machine-learning program 700 appraises values of the features 706 as they correlate to the training data 708. The result of the training is the trained machine-learning program 714 (e.g., a trained or learned model).

Further, the training phases 702 may involve machine learning (such as deep learning), in which the training data 708 is structured (e.g., labeled during preprocessing operations), and the trained machine-learning program 714 implements a relatively simple neural network 728 (or one of other machine learning models, as described herein) capable of performing, for example, classification and clustering operations. In other examples, the training phase 702 may involve training data 708 which is unstructured, and the trained machine-learning program 714 implements a deep neural network 728 that is able to perform both feature extraction and classification/clustering operations.

A neural network 728 generated or trained during the training phase 702 and implemented within the trained machine-learning program 714, may include a hierarchical (e.g., layered) organization of neurons. For example, neurons (or nodes) may be arranged hierarchically into a number of layers, including an input layer, an output layer, and multiple hidden layers. The layers within the neural network 728 can have one or many neurons, and the neurons operationally compute a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which define the influence of the input from a transmitting neuron to a receiving neuron.

In some examples, the neural network 728 may also be one of a number of different types of neural networks, including a single-layer feed-forward network, an Artificial Neural Network (ANN), a Recurrent Neural Network (RNN), a symmetrically connected neural network, and unsupervised pre-trained network, a Convolutional Neural Network (CNN), or a Recursive Neural Network (RNN), a network with a transformer architecture, and so forth (merely for example).

During prediction phases 704 the trained machine-learning program 714 is used to perform an assessment. Query data 712 is provided as an input to the trained machine-learning program 700, and the trained machine-learning program 714 generates the assessment 716 as output, responsive to receipt of the query data 712.

In some examples, one or more artificial intelligence agents, such as one or more machine-learned algorithms or models and/or a neural network of one or more machine-learned algorithms or models may be trained iteratively (e.g., in a plurality of stages) using a plurality of sets of input data. For example, a first set of input data may be used to train one or more of the artificial agents. Then, the first set of input data may be transformed into a second set of input data for retraining the one or more artificial intelligence agents. The continuously updated and retrained artificial intelligence agents may then be applied to subsequent novel input data to generate one or more of the outputs described herein.

Data Architecture

Figure 8:
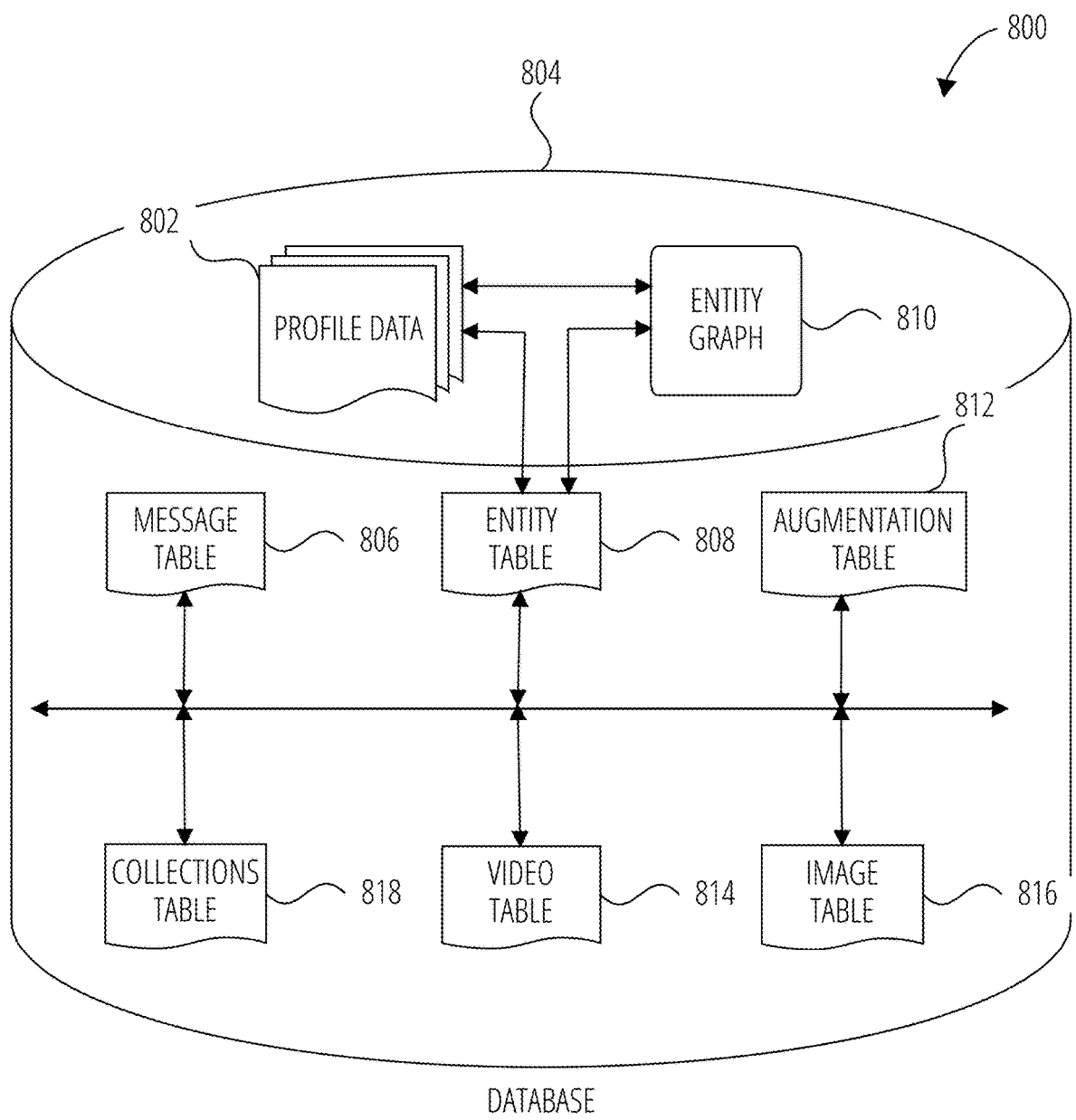
FIG. 8 is a diagrammatic representation of a data structure as maintained in a database, according to some examples.

FIG. 8 is a schematic diagram illustrating data structures 800, which may be stored in the database 804 of the interaction server system 110, according to certain examples. While the content of the database 804 is shown to comprise multiple tables, it will be appreciated that the data could be stored in other types of data structures (e.g., as an object-oriented database).

The database 804 includes message data stored within a message table 806. This message data includes, for any particular message, at least message sender data, message recipient (or receiver) data, and a payload. Further details regarding information that may be included in a message, and included within the message data stored in the message table 806, are described below with reference to FIG. 8.

An entity table 808 stores entity data, and is linked (e.g., referentially) to an entity graph 810 and profile data 802. Entities for which records are maintained within the entity table 808 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 810 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 808. Such privacy settings may be applied to all types of relationships within the context of the interaction system 100, or may selectively be applied to certain types of relationships.

The profile data 802 stores multiple types of profile data about a particular entity. The profile data 802 may be selectively used and presented to other users of the interaction system 100 based on privacy settings specified by a particular entity. Where the entity is an individual, the profile data 802 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 802 for the group may similarly include one or more avatar representations associated with the group, in addition to the group name, members, and various settings (e.g., notifications) for the relevant group.

The database 804 also stores augmentation data, such as overlays or filters, in an augmentation table 812. The augmentation data is associated with and applied to videos (for which data is stored in a video table 814) and images (for which data is stored in an image table 816).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 816 includes augmented reality content items (e.g., corresponding to applying "lenses" or augmented reality experiences). An augmented reality content item may be a real-time special effect and sound that may be added to an image or a video.

A collections table 818 stores data regarding collections of messages and associated image, video, or audio data, which are compiled into a collection (e.g., a story or a gallery). The creation of a particular collection may be initiated by a particular user (e.g., each user for which a record is maintained in the entity table 808). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 814 stores video data that, in some examples, is associated with messages for which records are maintained within the message table 806. Similarly, the image table 816 stores image data associated with messages for which message data is stored in the entity table 808. The entity table 808 may associate various augmentations from the augmentation table 812 with various images and videos stored in the image table 816 and the video table 814.

Data Communications Architecture

Figure 9:
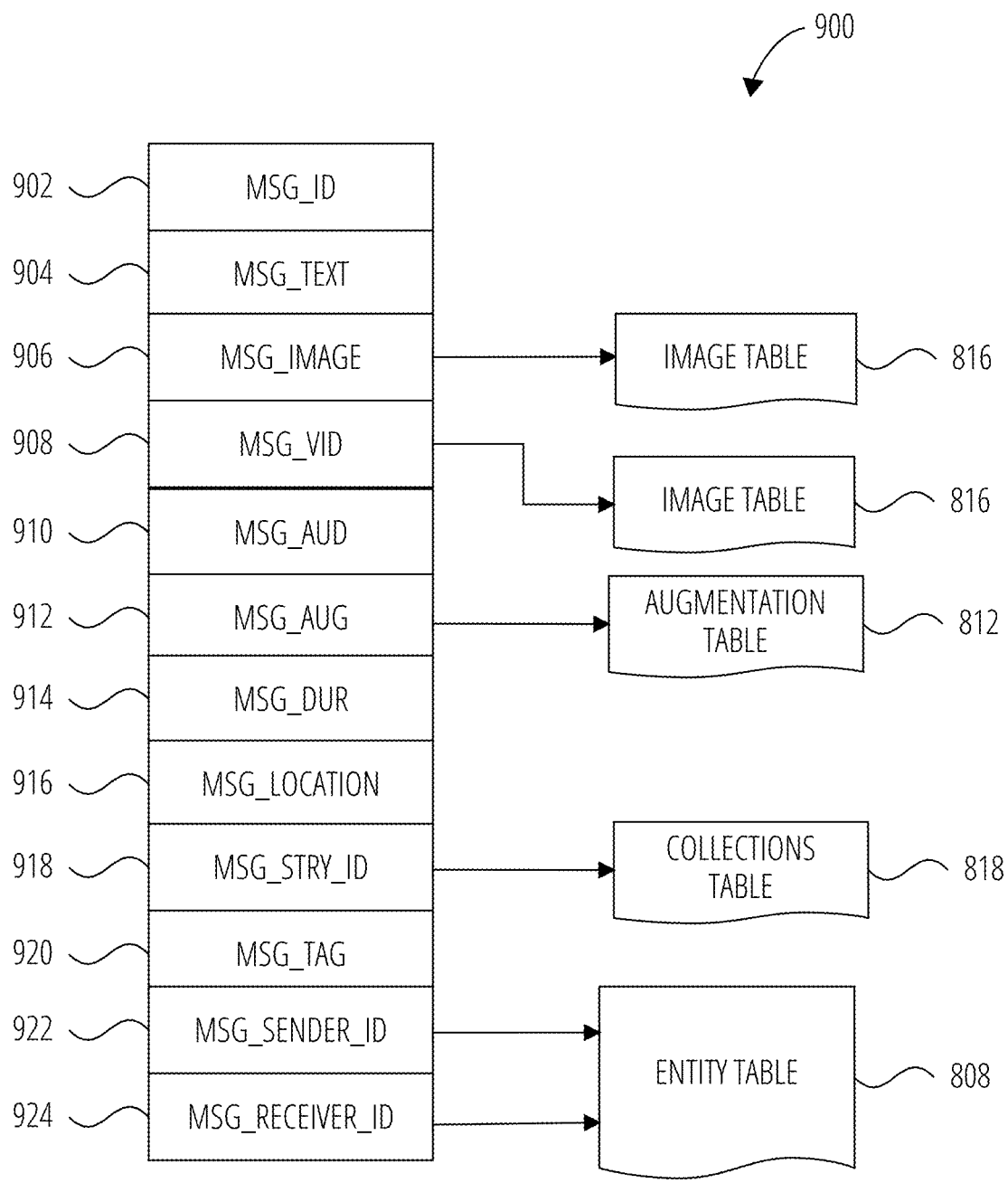
FIG. 9 is a diagrammatic representation of a message, according to some examples.

FIG. 9 is a schematic diagram illustrating a structure of a message 900, according to some examples, generated by an interaction client 104 for communication to a further interaction client 104 via the interaction servers 124. The content of a particular message 900 is used to populate the message table 806 stored within the database 804, accessible by the interaction servers 124. Similarly, the content of a message 900 is stored in memory as "in-transit" or "in-flight" data of the user system 102 or the interaction servers 124. A message 900 is shown to include the following example components:

Message identifier 902: a unique identifier that identifies the message 900.

Message text payload 904: text, to be generated by a user via a user interface of the user system 102, and that is included in the message 900.

Message image payload 906: image data, captured by a camera component of a user system 102 or retrieved from a memory component of a user system 102, and that is included in the message 900. Image data for a sent or received message 900 may be stored in the image table 816.

Message video payload 908: video data, captured by a camera component or retrieved from a memory component of the user system 102, and that is included in the message 900. Video data for a sent or received message 900 may be stored in the image table 816.

Message audio payload 910: audio data, captured by a microphone or retrieved from a memory component of the user system 102, and that is included in the message 900.

Message augmentation data 912: augmentation data (e.g., filters, stickers, or other annotations or enhancements) that represents augmentations to be applied to message image payload 906, message video payload 908, or message audio payload 910 of the message 900. Augmentation data for a sent or received message 900 may be stored in the augmentation table 812.

Message duration parameter 914: parameter value indicating, in seconds, the amount of time for which content of the message (e.g., the message image payload 906, message video payload 908, message audio payload 910) is to be presented or made accessible to a user via the interaction client 104.

Message geolocation parameter 916: geolocation data (e.g., latitudinal and longitudinal coordinates) associated with the content payload of the message. Multiple message geolocation parameter 916 values may be included in the payload, each of these parameter values being associated with respect to content items included in the content (e.g., a specific image within the message image payload 906, or a specific video in the message video payload 908).

Message story identifier 918: identifier values identifying one or more content collections (e.g., "stories" identified in the collections table 818) with which a particular content item in the message image payload 906 of the message 900 is associated. For example, multiple images within the message image payload 906 may each be associated with multiple content collections using identifier values.

Message tag 920: each message 900 may be tagged with multiple tags, each of which is indicative of the subject matter of content included in the message payload. For example, where a particular image included in the message image payload 906 depicts an animal (e.g., a lion), a tag value may be included within the message tag 920 that is indicative of the relevant animal. Tag values may be generated manually, based on user input, or may be automatically generated using, for example, image recognition.

Message sender identifier 922: an identifier (e.g., a messaging system identifier, email address, or device identifier) indicative of a user of the user system 102 on which the message 900 was generated and from which the message 900 was sent.

Message receiver identifier 924: an identifier (e.g., a messaging system identifier, email address, or device identifier) indicative of a user of the user system 102 to which the message 900 is addressed.

The contents (e.g., values) of the various components of message 900 may be pointers to locations in tables within which content data values are stored. For example, an image value in the message image payload 906 may be a pointer to (or address of) a location within an image table 816. Similarly, values within the message video payload 908 may point to data stored within an image table 816, values stored within the message augmentation data 912 may point to data stored in an augmentation table 812, values stored within the message story identifier 918 may point to data stored in a collections table 818, and values stored within the message sender identifier 922 and the message receiver identifier 924 may point to user records stored within an entity table 808.

System with Head-Wearable Apparatus

Figure 10:
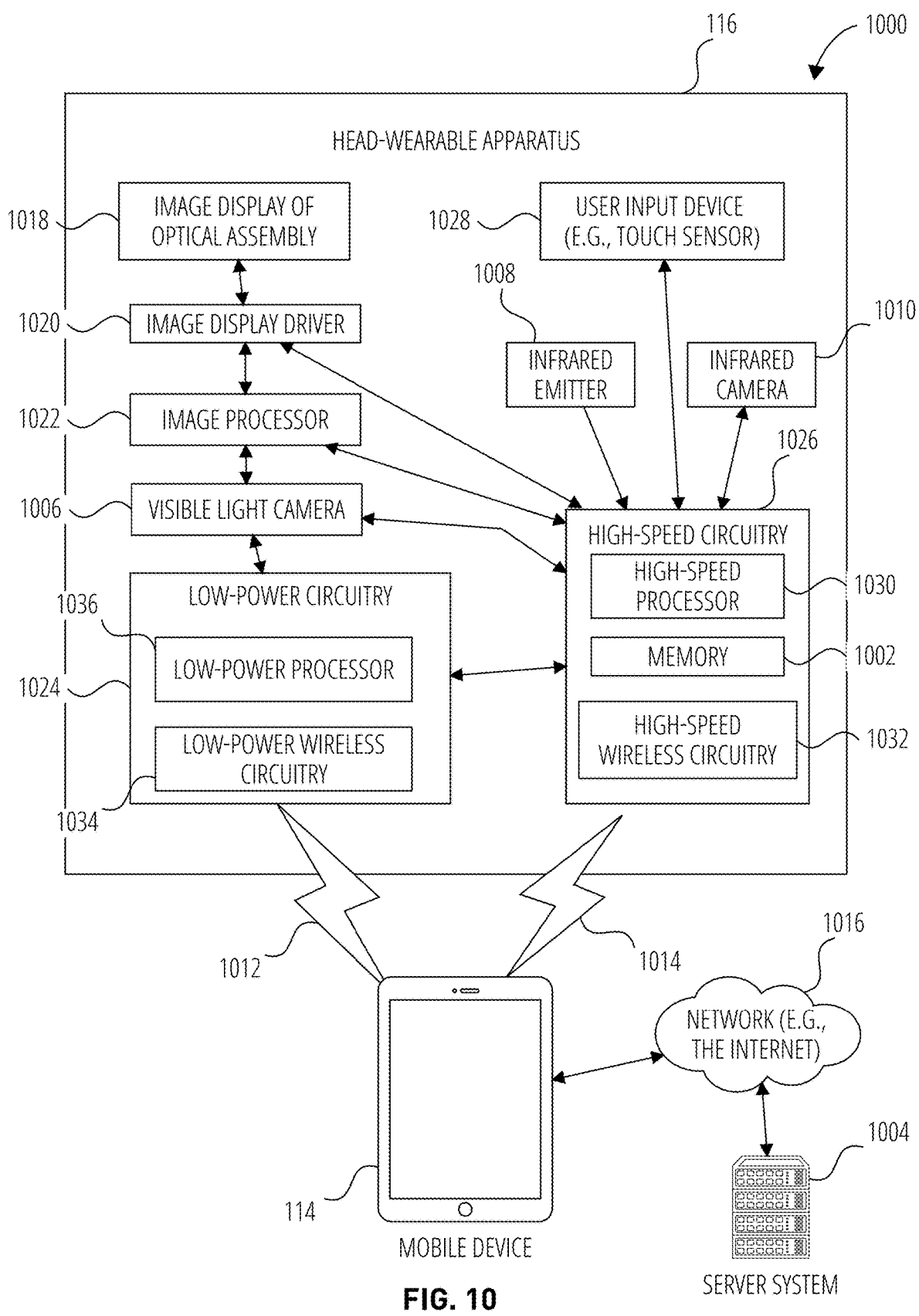
FIG. 10 illustrates a system in which the head-wearable apparatus, according to some examples.

FIG. 10 illustrates a system 1000 including a head-wearable apparatus 116 with a selector input device, according to some examples. FIG. 10 is a high-level functional block diagram of an example head-wearable apparatus 116 communicatively coupled to a mobile device 114 and various server systems 1004 (e.g., the interaction server system 110) via various networks 108.

The head-wearable apparatus 116 includes one or more cameras, each of which may be, for example, a visible light camera 1006, an infrared emitter 1008, and an infrared camera 1010.

The mobile device 114 connects with head-wearable apparatus 116 using both a low-power wireless connection 1012 and a high-speed wireless connection 1014. The mobile device 114 is also connected to the server system 1004 and the network 1016.

The head-wearable apparatus 116 further includes two image displays of the image display of optical assembly 1018. The two image displays of optical assembly 1018 include one associated with the left lateral side and one associated with the right lateral side of the head-wearable apparatus 116. The head-wearable apparatus 116 also includes an image display driver 1020, an image processor 1022, low-power circuitry 1024, and high-speed circuitry 1026. The image display of optical assembly 1018 is for presenting images and videos, including an image that can include a graphical user interface to a user of the head-wearable apparatus 116.

The image display driver 1020 commands and controls the image display of optical assembly 1018. The image display driver 1020 may deliver image data directly to the image display of optical assembly 1018 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 1028 (e.g., touch sensor or push button), including an input surface on the head-wearable apparatus 116. The user input device 1028 (e.g., touch sensor or push button) is to receive from the user an input selection to manipulate the graphical user interface of the presented image.

The components shown in FIG. 10 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 1006 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 1002, which stores instructions to perform a subset or all of the functions described herein. The memory 1002 can also include storage device.

As shown in FIG. 10, the high-speed circuitry 1026 includes a high-speed processor 1030, a memory 1002, and high-speed wireless circuitry 1032. In some examples, the image display driver 1020 is coupled to the high-speed circuitry 1026 and operated by the high-speed processor 1030 in order to drive the left and right image displays of the image display of optical assembly 1018. The high-speed processor 1030 may be any processor capable of managing high-speed communications and operation of any general computing system needed for the head-wearable apparatus 116. The high-speed processor 1030 includes processing resources needed for managing high-speed data transfers on a high-speed wireless connection 1014 to a wireless local area network (WLAN) using the high-speed wireless circuitry 1032. In certain examples, the high-speed processor 1030 executes an operating system such as a LINUX operating system or other such operating system of the head-wearable apparatus 116, and the operating system is stored in the memory 1002 for execution. In addition to any other responsibilities, the high-speed processor 1030 executing a software architecture for the head-wearable apparatus 116 is used to manage data transfers with high-speed wireless circuitry 1032. In certain examples, the high-speed wireless circuitry 1032 is configured to implement Institute of Electrical and Electronic Engineers (IEEE) 802.11 communication standards, also referred to herein as WI-FI®. In some examples, other high-speed communications standards may be implemented by the high-speed wireless circuitry 1032.

The low-power wireless circuitry 1034 and the high-speed wireless circuitry 1032 of the head-wearable apparatus 116 can include short-range transceivers (Bluetooth™) and wireless wide, local, or wide area network transceivers (e.g., cellular or WI-FI®). Mobile device 114, including the transceivers communicating via the low-power wireless connection 1012 and the high-speed wireless connection 1014, may be implemented using details of the architecture of the head-wearable apparatus 116, as can other elements of the network 1016.

The memory 1002 includes any storage device capable of storing various data and applications, including, among other things, camera data generated by the left and right visible light cameras 1006, the infrared camera 1010, and the image processor 1022, as well as images generated for display by the image display driver 1020 on the image displays of the image display of optical assembly 1018. While the memory 1002 is shown as integrated with high-speed circuitry 1026, in some examples, the memory 1002 may be an independent standalone element of the head-wearable apparatus 116. In certain such examples, electrical routing lines may provide a connection through a chip that includes the high-speed processor 1030 from the image processor 1022 or the low-power processor 1036 to the memory 1002. In some examples, the high-speed processor 1030 may manage addressing of the memory 1002 such that the low-power processor 1036 will boot the high-speed processor 1030 any time that a read or write operation involving memory 1002 is needed.

As shown in FIG. 10, the low-power processor 1036 or high-speed processor 1030 of the head-wearable apparatus 116 can be coupled to the camera (visible light camera 1006, infrared emitter 1008, or infrared camera 1010), the image display driver 1020, the user input device 1028 (e.g., touch sensor or push button), and the memory 1002.

The head-wearable apparatus 116 is connected to a host computer. For example, the head-wearable apparatus 116 is paired with the mobile device 114 via the high-speed wireless connection 1014 or connected to the server system 1004 via the network 1016. The server system 1004 may be one or more computing devices as part of a service or network computing system, for example, that includes a processor, a memory, and network communication interface to communicate over the network 1016 with the mobile device 114 and the head-wearable apparatus 116.

The mobile device 114 includes a processor and a network communication interface coupled to the processor. The network communication interface allows for communication over the network 1016, low-power wireless connection 1012, or high-speed wireless connection 1014. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 1020. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 1004, such as the user input device 1028, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 1012 and high-speed wireless connection 1014 from the mobile device 114 via the low-power wireless circuitry 1034 or high-speed wireless circuitry 1032.

Machine Architecture

Figure 11:
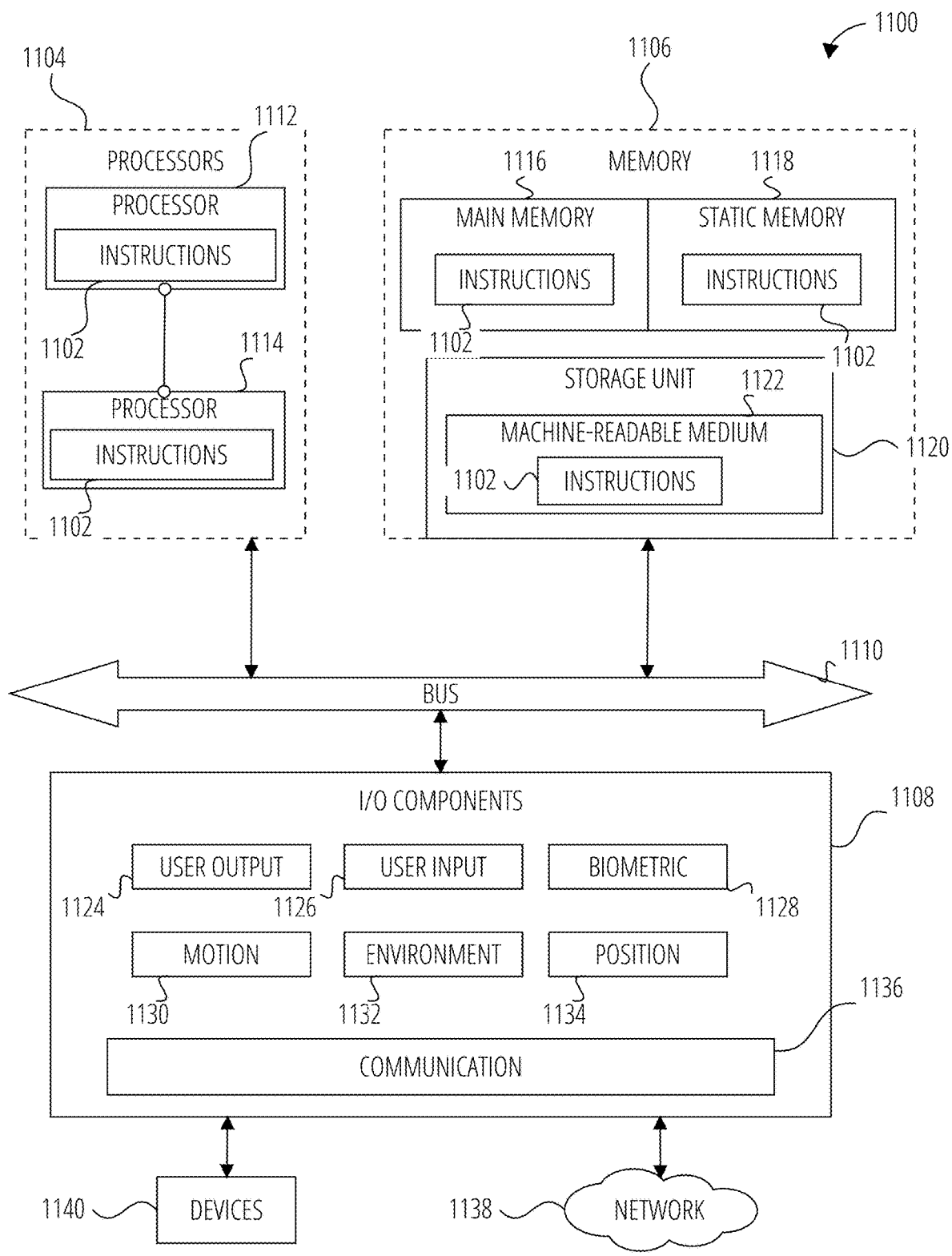
FIG. 11 is a diagrammatic representation of a machine in the form of a computer system within which a set of instructions may be executed to cause the machine to perform any one or more of the methodologies discussed herein, according to some examples.

FIG. 11 is a diagrammatic representation of the machine 1100 within which instructions 1102 (e.g., software, a program, an application, an applet, an app, or other executable code) for causing the machine 1100 to perform any one or more of the methodologies discussed herein may be executed. For example, the instructions 1102 may cause the machine 1100 to execute any one or more of the methods described herein. The instructions 1102 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1102, sequentially or otherwise, that specify actions to be taken by the machine 1100. Further, while a single machine 1100 is illustrated, the term "machine "shall also be taken to include a collection of machines that individually or jointly execute the instructions 1102 to perform any one or more of the methodologies discussed herein. The machine 1100, for example, may comprise the user system 102 or any one of multiple server devices forming part of the interaction server system 110. In some examples, the machine 1100 may also comprise both client and server systems, with certain operations of a particular method or algorithm being performed on the server-side and with certain operations of the particular method or algorithm being performed on the client-side.

The machine 1100 may include processors 1104, memory 1106, and input/output I/O components 1108, which may be configured to communicate with each other via a bus 1110. In an example, the processors 1104 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1112 and a processor 1114 that execute the instructions 1102. The term "processor" is intended to include multi-core processors that may comprise two or more independent processors (sometimes referred to as "cores") that may execute instructions contemporaneously. Although FIG. 11 shows multiple processors 1104, the machine 1100 may include a single processor with a single-core, a single processor with multiple cores (e.g., a multi-core processor), multiple processors with a single core, multiple processors with multiples cores, or any combination thereof.

The memory 1106 includes a main memory 1116, a static memory 1118, and a storage unit 1120, both accessible to the processors 1104 via the bus 1110. The main memory 1106, the static memory 1118, and storage unit 1120 store the instructions 1102 embodying any one or more of the methodologies or functions described herein. The instructions 1102 may also reside, completely or partially, within the main memory 1116, within the static memory 1118, within machine-readable medium 1122 within the storage unit 1120, within at least one of the processors 1104 (e.g., within the processor's cache memory), or any suitable combination thereof, during execution thereof by the machine 1100.

The I/O components 1108 may include a wide variety of components to receive input, provide output, produce output, transmit information, exchange information, capture measurements, and so on. The specific I/O components 1108 that are included in a particular machine will depend on the type of machine. For example, portable machines such as mobile phones may include a touch input device or other such input mechanisms, while a headless server machine will likely not include such a touch input device. It will be appreciated that the I/O components 1108 may include many other components that are not shown in FIG. 11. In various examples, the I/O components 1108 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1108 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that can be understood by a computer, and then using the resulting signals to control the device or machine.

Example types of BMI technologies, including:
  Electroencephalography (EEG) based BMIs, which record electrical activity in the brain using electrodes placed on the scalp.

Invasive BMIs, which used electrodes that are surgically implanted into the brain.

Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 3600 camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1108 further include communication components 1136 operable to couple the machine 1100 to a network 1138 or devices 1140 via respective coupling or connections. For example, the communication components 1136 may include a network interface component or another suitable device to interface with the network 1138. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1140 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1116, static memory 1118, and memory of the processors 1104) and storage unit 1120 may store one or more sets of instructions and data structures (e.g., software) embodying or used by any one or more of the methodologies or functions described herein. These instructions (e.g., the instructions 1102), when executed by processors 1104, cause various operations to implement the disclosed examples.

The instructions 1102 may be transmitted or received over the network 1138, using a transmission medium, via a network interface device (e.g., a network interface component included in the communication components 1136) and using any one of several well-known transfer protocols (e.g., hypertext transfer protocol (HTTP)). Similarly, the instructions 1102 may be transmitted or received using a transmission medium via a coupling (e.g., a peer-to-peer coupling) to the devices 1140.

Software Architecture

Figure 12:
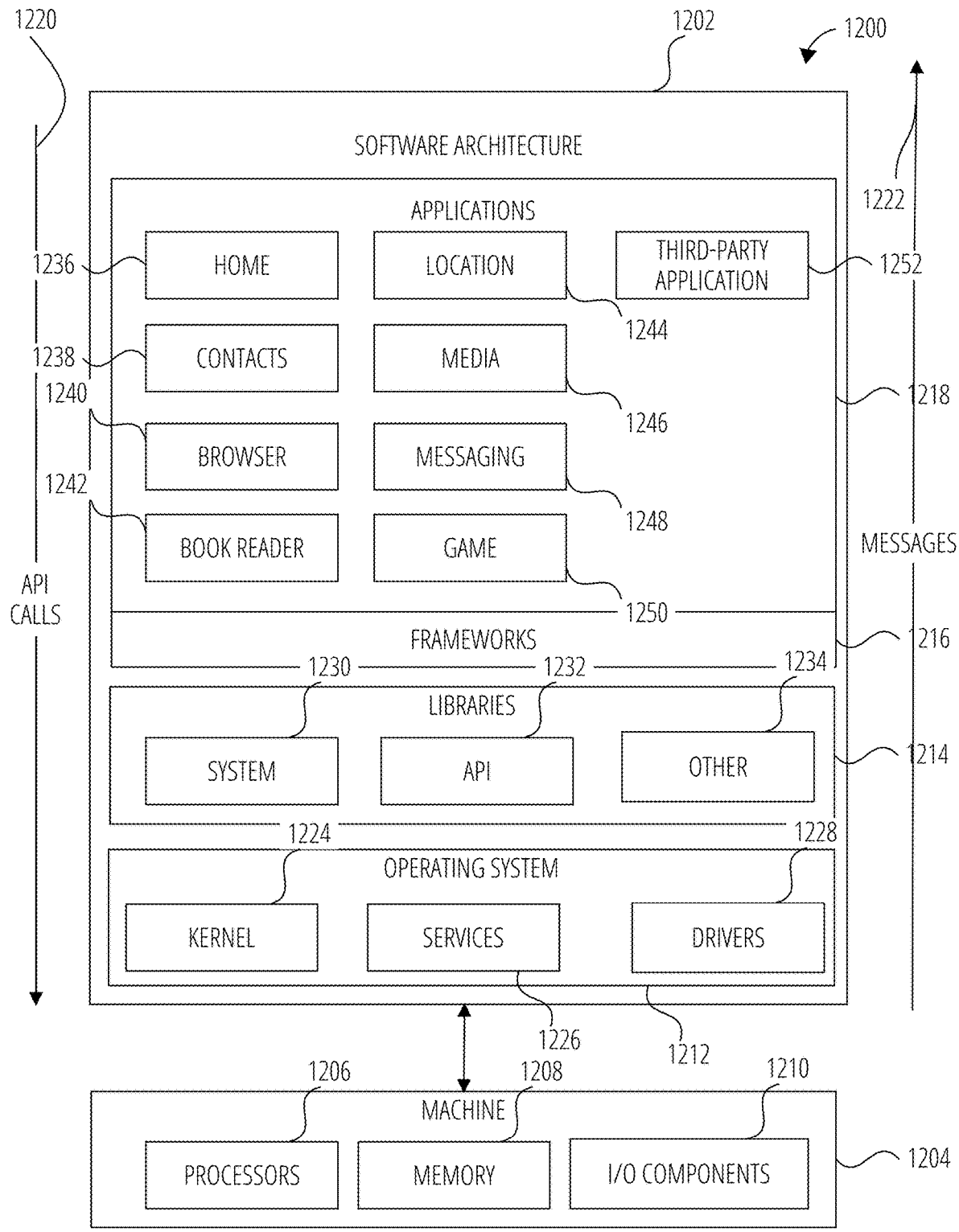
FIG. 12 is a block diagram showing a software architecture within which examples may be implemented.

FIG. 12 is a block diagram 1200 illustrating a software architecture 1202, which can be installed on any one or more of the devices described herein. The software architecture 1202 is supported by hardware such as a machine 1204 that includes processors 1206, memory 1208, and I/O components 1210. In this example, the software architecture 1202 can be conceptualized as a stack of layers, where each layer provides a particular functionality. The software architecture 1202 includes layers such as an operating system 1212, libraries 1214, frameworks 1216, and applications 1218. Operationally, the applications 1218 invoke API calls 1220 through the software stack and receive messages 1222 in response to the API calls 1220.

The operating system 1212 manages hardware resources and provides common services. The operating system 1212 includes, for example, a kernel 1224, services 1226, and drivers 1228. The kernel 1224 acts as an abstraction layer between the hardware and the other software layers. For example, the kernel 1224 provides memory management, processor management (e.g., scheduling), component management, networking, and security settings, among other functionalities. The services 1226 can provide other common services for the other software layers. The drivers 1228 are responsible for controlling or interfacing with the underlying hardware. For instance, the drivers 1228 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1214 provide a common low-level infrastructure used by the applications 1218. The libraries 1214 can include system libraries 1230 (e.g., C standard library) that provide functions such as memory allocation functions, string manipulation functions, mathematic functions, and the like. In addition, the libraries 1214 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1214 can also include a wide variety of other libraries 1234 to provide many other APIs to the applications 1218.

The frameworks 1216 provide a common high-level infrastructure that is used by the applications 1218. For example, the frameworks 1216 provide various graphical user interface (GUI) functions, high-level resource management, and high-level location services. The frameworks 1216 can provide a broad spectrum of other APIs that can be used by the applications 1218, some of which may be specific to a particular operating system or platform.

In an example, the applications 1218 may include a home application 1236, a contacts application 1238, a browser application 1240, a book reader application 1242, a location application 1244, a media application 1246, a messaging application 1248, a game application 1250, and a broad assortment of other applications such as a third-party application 1252. The applications 1218 are programs that execute functions defined in the programs. Various programming languages can be employed to create one or more of the applications 1218, structured in a variety of manners, such as object-oriented programming languages (e.g., Objective-C, Java, or C++) or procedural programming languages (e.g., C or assembly language). In a specific example, the third-party application 1252 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1252 can invoke the API calls 1220 provided by the operating system 1212 to facilitate functionalities described herein.

EXAMPLES

Example 1 is a system comprising: at least one processor; at least one memory component storing instructions that, when executed by the at least one processor, cause the at least one processor to perform operations comprising: retrieving candidate effects to present to a user; computing initial scores for the candidate effects; computing adjusted scores for the candidate effects, each adjusted score for an effect being based on an initial score for the effect and a demotion factor, the demotion factor being computed based on interaction data associated with the user and the candidate effects; generating a set of recommended effects based on the candidate effects and associated adjusted scores; and causing the set of recommended effects to be presented to the user on a computing device.

In Example 2, the subject matter of Example 1 includes, wherein the demotion factor for the effect is further computed based on a number of consecutive repeated actions being performed by the user, during a first predetermined interval, with respect to the effect.

In Example 3, the subject matter of Examples 1-2 includes, wherein the interaction data specifies: a first set of candidate effects the user has not interacted with, using an action, during a second predetermined interval, and a second set of candidate effects the user has interacted with, using the action, during the second predetermined interval.

In Example 4, the subject matter of Example 3 includes, wherein the demotion factor for the effect is further computed based on at least one of: a first conversion rate of the user on the first set of candidate effects, or a second conversion rate of the user on the second set of candidate effects.

In Example 5, the subject matter of Examples 3-4 includes, wherein the demotion factor for the effect is further computed based on at least one of: a first conversion rate of the first set of candidate effects, or a second conversion rate of the second set of candidate effects.

In Example 6, the subject matter of Examples 1-5 includes, wherein the demotion factor for the effect is further computed based on at least one of a base demotion factor or a demotion strength factor.

In Example 7, the subject matter of Examples 1-6 includes, wherein the candidate effects comprise one or more of at least lenses, filters, image stylization effects, or video stylization effects.

In Example 8, the subject matter of Examples 2-7 includes, wherein the actions are swipe actions.

In Example 9, the subject matter of Examples 1-8 includes, wherein computing initial scores of the candidate effects comprises computing a conversion rate for one or more of the candidate effects.

In Example 10, the subject matter of Examples 3-9 includes, wherein computing initial scores for the candidate effects uses a first machine learning (ML) model trained on a first dataset comprising interactions between users and the candidate effects.

In Example 11, the subject matter of Example 10 includes, wherein computing initial scores for the candidate effects is further based on a second machine learning (ML) model trained on a second dataset, wherein: the second dataset comprises interactions between users and candidate effects that have been interacted with by users using the action; and the second dataset excludes interactions between users and candidate effects that have not been interacted with by users using the action.

In Example 12, the subject matter of Example 11 includes, the operations further comprising: generating initial scores for the first set of candidate effects using the first ML model; generating initial scores for the second set of candidate effects using the second ML model; and generating adjusted scores for the candidate effects by preserving values of the initial scores for the candidate effects.

In Example 13, the subject matter of Examples 10-12 includes, the operations further comprising: generating initial scores for all candidate effects using the first ML model; generating adjusted scores for the first set of candidate effects by preserving values of initial scores for the respective candidate effects; and generating adjusted scores for the second set of candidate effects based on the initial scores for the respective candidate effects and associated demotion factors.

In Example 14, the subject matter of Examples 1-13 includes, the operations further comprising ranking the set of recommended effects based on their associated adjusted scores.

In Example 15, the subject matter of Examples 1-14 includes, wherein generating the set of recommended effects comprises discarding some of the candidate effects based on their adjusted scores transgressing a threshold.

In Example 16, the subject matter of Example 15 includes, wherein the threshold is automatically computed based on at least one of a distribution of initial scores for candidate effects, and a distribution of initial scores for a subset of candidate effects being interacted with by users over a predetermined period of time.

In Example 17, the subject matter of Examples 1-16 includes, wherein generating the set of recommended effects comprises retaining a maximum predetermined number of the candidate effects based on their adjusted scores.

In Example 18, the subject matter of Examples 9-17 includes, wherein computing a conversion rate for a candidate effect is based on one or more of a plurality of conversion actions, the plurality of conversion actions comprising one of at least a click action, a send action, or a long view action.

Example 19 is at least one machine-readable medium including instructions that, when executed by processing circuitry, cause the processing circuitry to perform operations to implement of any of Examples 1-18.

Example 20 is an apparatus comprising means to implement any of Examples 1-18.

Example 21 is a method to implement any of Examples 1-18.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

Notes:

Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

What is claimed is:

1. A system comprising:
   at least one processor;
   at least one memory component storing instructions that, when executed by the at least one processor, cause the at least one processor to perform operations comprising:
   retrieving candidate effects to present to a user;
   computing initial scores for the candidate effects using a machine learning (ML) model trained on a dataset that comprises first user interactions with select candidate effects using an action, wherein the dataset excludes second user interactions with other candidate effects not using the action;
   computing adjusted scores for the candidate effects, each adjusted score for an effect being based on an initial score for the effect and a demotion factor, the demotion factor being computed based on interaction data associated with the user and the candidate effects;
   generating a set of recommended effects based on the candidate effects and associated adjusted scores; and
   causing the set of recommended effects to be presented to the user on a computing device.

2. The system of claim 1, wherein the demotion factor for the effect is further computed based on a number of consecutive repeated actions being performed by the user, during a first predetermined interval, with respect to the effect.

3. The system of claim 2, wherein the actions are swipe actions.

4. The system of claim 1, wherein the interaction data specifies:
   a first set of candidate effects the user has not interacted with, using the action, during a second predetermined interval, and
   a second set of candidate effects the user has interacted with, using the action, during the second predetermined interval.

5. The system of claim 4, wherein the demotion factor for the effect is further computed based on at least one of:
   a first conversion rate of the user on the first set of candidate effects, or
   a second conversion rate of the user on the second set of candidate effects.

6. The system of claim 4, wherein the demotion factor for the effect is further computed based on at least one of:
   a first conversion rate of the first set of candidate effects, or
   a second conversion rate of the second set of candidate effects.

7. The system of claim 4, wherein computing initial scores for the candidate effects further uses an additional machine learning (ML) model trained on an additional dataset comprising interactions between users and the candidate effects.

8. The system of claim 7, the operations further comprising:
   computing first initial scores for the first set of candidate effects using the additional ML model;
   computing second initial scores for the second set of candidate effects using the ML model; and
   computing adjusted scores for the candidate effects by preserving values of the initial scores for the candidate effects.

9. The system of claim 7, the operations further comprising:
   computing initial scores for all candidate effects using the additional ML model;
   computing adjusted scores for the first set of candidate effects by preserving values of initial scores for the respective candidate effects; and
   computing adjusted scores for the second set of candidate effects based on the initial scores for the respective candidate effects and associated demotion factors.

10. The system of claim 1, wherein the demotion factor for the effect is further computed based on at least one of a base demotion factor or a demotion strength factor.

11. The system of claim 1, wherein the candidate effects comprise one or more of at least lenses, filters, image stylization effects, or video stylization effects.

12. The system of claim 1, wherein computing initial scores of the candidate effects comprises computing a conversion rate for one or more of the candidate effects.

13. The system of claim 12, wherein computing a conversion rate for a candidate effect is based on one or more of a plurality of conversion actions, the plurality of conversion actions comprising one of at least a click action, a send action, a snap action, or a long view action.

14. The system of claim 1, the operations further comprising ranking the set of recommended effects based on their associated adjusted scores.

15. The system of claim 1, wherein generating the set of recommended effects comprises discarding some of the candidate effects based on their adjusted scores transgressing a threshold.

16. The system of claim 15, wherein the threshold is automatically computed based on at least one of a distribution of initial scores for candidate effects and a distribution of initial scores for a subset of candidate effects interacted with by users over a predetermined period of time.

17. The system of claim 1, wherein generating the set of recommended effects comprises retaining a maximum predetermined number of the candidate effects based on their adjusted scores.

18. A non-transitory computer-readable storage medium storing instructions that, when executed by at least one processor, cause the at least one processor to perform operations comprising:
    retrieving candidate effects to present to a user;
    computing initial scores for the candidate effects using a machine learning (ML) model trained on a dataset that comprises first user interactions with select candidate effects using an action, wherein the dataset excludes second user interactions with other candidate effects not using the action;
    computing adjusted scores for the candidate effects, each adjusted score for an effect being based on an initial score for the effect and a demotion factor, the demotion factor being computed based on interaction data associated with the user and the candidate effects;
    generating a set of recommended effects based on the candidate effects and associated adjusted scores; and
    causing the set of recommended effects to be presented to the user on a computing device.

19. A method comprising:
    retrieving candidate effects to present to a user;
    computing initial scores for the candidate effects using a machine learning (ML) model trained on a dataset that comprises first user interactions with select candidate effects using an action, wherein the dataset excludes second user interactions with other candidate effects not using the action;
    computing adjusted scores for the candidate effects, each adjusted score for an effect being based on an initial score for the effect and a demotion factor, the demotion factor being computed based on interaction data associated with the user and the candidate effects;
generating a set of recommended effects based on the candidate effects and associated adjusted scores; and
causing the set of recommended effects to be presented to the user on a computing device.

* * * * *